(12) United States Patent     (10) Patent No.:   US 12,637,367 B2

McCabe     (45) Date of Patent:     May 26, 2026

(54) DEVICE FOR REMOVING FATS, OILS AND/OR GREASE (FOGs) FROM WATER

(71) Applicant: Buttress Group Ltd., Hertfordshire (GB)

(72) Inventor: Kevin McCabe, Naas (IE)

(73) Assignee: BUTTRESS GROUP LTD, Watford (GB)

( * ) Notice: Subject to any disclaimer, the term of this patent is extended or adjusted under 35 U.S.C. 154(b) by 495 days.

(21) Appl. No.: 17/624,227

(22) PCT Filed: Jun. 30, 2020

(86) PCT No.: PCT/EP2020/068364

§ 371 (c)(1),
(2) Date: Dec. 30, 2021

(87) PCT Pub. No.: WO2021/001352

PCT Pub. Date: Jan. 7, 2021

(65) Prior Publication Data

US 2022/0356082 A1     Nov. 10, 2022

(30) Foreign Application Priority Data

Jul. 1, 2019    (GB) ..................................... 1909460

(51) Int. Cl.
    *C02F 1/40*       (2023.01)
    *B01D 17/02*      (2006.01)
       (Continued)

(52) U.S. Cl.
    CPC ............ *C02F 1/40* (2013.01); *B01D 17/0202* (2013.01); *B01D 17/0211* (2013.01);
       (Continued)

(58) Field of Classification Search
    CPC . C02F 1/40; C02F 1/001; C02F 1/283; B01D 17/0202; B01D 17/0211;
       (Continued)

(56) References Cited

U.S. PATENT DOCUMENTS 4,001,120 A    1/1977   Gelman
4,961,974 A   *   10/1990   Jones ........................ B32B 7/12
                                      428/36.1

(Continued)

FOREIGN PATENT DOCUMENTS

CN       101371954       2/2009
CN       105016504 A   *   11/2015

(Continued)

OTHER PUBLICATIONS

SSAB https://www.ssab.com/en/brands-and-products/steel-categories/coated-steel/metal-coated-formable-steels (Year: NONE).*

(Continued)

*Primary Examiner* — Liam Royce

(74) *Attorney, Agent, or Firm* — Lippes Mathias LLP

(57)         ABSTRACT

A device and a method for removing fats, oils and/or grease ("FOGs") from water comprise a separator, wherein the separator removes the FOGs that separate from the water under gravity, and a filter wherein the filter removes the (Continued)

FOGs remaining in the water after the water has passed through the separator. The filter comprises several layers having different compositions suitable for removing FOGs from water, including a layer comprising granular activated carbon bonded together and wrapped in polyester.

23 Claims, 9 Drawing Sheets

(51) Int. Cl.

| | |
|---|---|
| *B01D 39/16* | (2006.01) |
| *B01D 39/20* | (2006.01) |
| *C02F 1/00* | (2023.01) |
| *C02F 1/28* | (2023.01) |
| *E03F 5/16* | (2006.01) |
| *C02F 101/32* | (2006.01) |

(52) U.S. Cl.
CPC ....... *B01D 17/0214* (2013.01); *B01D 39/163* (2013.01); *B01D 39/1692* (2013.01); *B01D 39/2041* (2013.01); *B01D 39/2062* (2013.01); *C02F 1/001* (2013.01); *C02F 1/283* (2013.01); *E03F 5/16* (2013.01); *B01D 2239/0407* (2013.01); *B01D 2239/0478* (2013.01); *B01D 2239/0618* (2013.01); *B01D 2239/065* (2013.01); *B01D 2239/1216* (2013.01); *B01D 2239/1233* (2013.01); *B01D 2239/1291* (2013.01); *C02F 2001/007* (2013.01); *C02F 2101/32* (2013.01); *C02F 2201/005* (2013.01)

(58) Field of Classification Search
CPC .............. B01D 17/0214; B01D 17/045; B01D 239/163; B01D 239/1692; B01D 239/2041; B01D 239/2062; E03F 5/16
See application file for complete search history.

(56) References Cited

U.S. PATENT DOCUMENTS

| | | | | |
|---|---|---|---|---|
| 6,001,249 | A | * | 12/1999 | Bailey ..................... C02F 1/003 |
| | | | | 210/85 |
| 7,033,496 | B2 | * | 4/2006 | Thacker ............. B01D 17/0211 |
| | | | | 210/538 |
| 2005/0211620 | A1 | | 9/2005 | Owen et al. |
| 2006/0157397 | A1 | | 7/2006 | Yokota |
| 2012/0067215 | A1 | * | 3/2012 | Lindahl ................ B01D 46/521 |
| | | | | 96/153 |
| 2012/0152864 | A1 | | 6/2012 | Sowerby et al. |

FOREIGN PATENT DOCUMENTS

| | | | | |
|---|---|---|---|---|
| DE | | 1813886 A1 | * | 7/1970 |
| EP | | 0 890 381 | | 1/1999 |
| GB | | 299648 A | * | 11/1928 |
| GB | | 1 499 347 | | 2/1978 |
| WO | WO 2014/025689 | | | 2/2014 |
| WO | WO 2015/015192 | | | 2/2015 |

OTHER PUBLICATIONS

API Publication 421, "Monographs on Refinery Environmental Control—Management of Water Discharges," American Petroleum Institute, 1st ed., 1990.

Bande, Rupesh M. et al., "Oil field effluent water treatment for safe disposal by electroflotation," Chem. Eng. J., vol. 137(3), Apr. 15, 2008, pp. 503-509.

CN OA (202080061196.9)—Dated Jun. 16, 2023, 12 pgs.

English translation—CN OA (202080061196.9)—11 pgs.

* cited by examiner

DEVICE FOR REMOVING FATS, OILS AND/OR GREASE (FOGs) FROM WATER

FIELD OF THE INVENTION

The present invention relates a filter, a device and a method for removing fats, oils and/or grease ("FOGs") from water.

BACKGROUND

Commercial and industrial kitchens and catering establishments, such as restaurants, fast food outlets, work canteens and food processing units often produce large volumes of waste water contaminated by fats, oils and/or grease ("FOGs"). Kitchens in residential properties such as houses and apartments may also produce volumes of waste water contaminated by FOGs.

A large proportion of FOGs are produced as a result of cooking or otherwise breaking down of food stuffs, in particular vegetable and/or animal products. When cooking equipment, food preparatory equipment, food preparatory surfaces, eating utensils and certain fabrics (e.g. tea towels, table cloths, napkins) contaminated by FOGs are washed, these FOGs end up contaminating water.

Catering FOGs include e.g. chicken fats, beef fats, duck fats, lamb fats, pork fats, fish oils, butter, margarines, spreads, mayonnaise, palm oils, corn oils, rape seed oils, sunflower oils, olive oils, cooking oils, vegetable oils, ice cream and milkshakes.

Large volumes of waste water contaminated by FOGs generally exit kitchens and catering establishments by the drainage and sewerage systems. If untreated, FOGs may collect in the drainage and sewerage systems and cause blockages. In particular, if the FOGs solidify they may form so called "fatbergs", which are large conglomerates of FOGs which block sewers, fatbergs often have to be manually broken down to remove them from the sewers.

Waste water contaminated by FOGs may also cause problems in sewage treatment systems. If FOGs reach the bacteria or biomass present in sewage treatment systems to digest the sewerage, the biomass can be suffocated by the FOGs and the necessary treatment does not take place. The addition of chemicals and/or enzymes can also create a chemical oxygen demand that can asphyxiate active microbes.

With the evolution of commercial kitchens and processes, larger volumes of waste water are being created. In addition, there are ever increasing demands from environmentally conscious and environmentally responsible businesses and business owners, who desire a "near zero" FOG pollution risk from their commercial kitchens and catering establishments.

In recent years, the international media have begun to highlight the huge amounts of FOGs that end up in the sewerage systems and in many cases the polluters are being held accountable. Therefore, larger national and international food and catering chains are now actively insisting on a near zero FOG discharge. Such companies do not want their brands associated with environmental pollution and the creation of fatbergs.

Therefore, it is imperative that FOGs are removed from waste water before entering the drainage and sewerage systems.

FOGs and water are immiscible liquids, meaning that they do not form a homogenous mixture when mixed together.

FOG droplets having a droplet size of ≥150 μm are categorised as a micro-emulsion weak and are able to separate from water under gravity with a separation time of ≤10 minutes [1]. Such FOG droplets are reasonably easy to separate and remove from contaminated water.

FOG/water separators are known pieces of equipment which are used in many industries. Conventional FOG/water separators work by separating FOGs from water contaminated by FOGs, using the property that FOGs having a lower density than water ("low density FOGs") will naturally separate from the water and will float on top of the water. Various techniques, such as skimming, are then used to remove these low density FOGs from the water surface.

An example of a commercially available FOG/water separation device is shown by FIG. 1.

FIG. 1 is a cross sectional side view of a device for separating immiscible liquids according to EP0890381 B1. The separation device (14) comprises an upright weir plate (8) and an upright control plate (16) located in a tank (2). The weir plate separates the tank (2) into an inlet chamber (10) and an outlet chamber (12). The bottom of the control plate (16) defines a slot (18) between the control plate (16) and the base of the tank (2). A top plate (20) caps a part of the inlet chamber (10) to a side of the control plate (16) remote from the weir plate (8). The top plate (20) has an apex positioned below the level of the top of the weir plate (8), in which an aperture is formed. The separation device further comprises an inlet (4) to the inlet chamber (10) positioned at a level below the top plate (20), an outlet (6) from the outlet chamber (12) positioned at a level below the top of the weir plate (8), and a riser tube (22) extending upwardly from the aperture in the top plate (20) to a level above that of the top of the weir plate (8).

In operation of such an arrangement, oil and water enters the tank (2) through the inlet (4) to fill the inlet chamber (10). The oil floats upwards in the water to the top of the water where it is contained in the inlet chamber (10) below the top plate (20). An oil/water interface may form below the top plate (20) as indicated by feature (26). The water passes through the slot (18) between the control plate (16) and the base of the tank (2), over the top of the weir plate (8), into the outlet chamber (12) and through the outlet (6) to exit the tank (2). A continuous supply of oil/water mixture through the separator results in the oil accumulating in the riser tube (22) and eventually flowing therefrom.

This separation device further includes a control valve (28) positioned in the lower regions of the riser tube. The control valve (28) maintains the oil/water interface should there be a surge in the supply of the oil/water mixture.

A further known separation device is shown by FIG. 2.

FIG. 2 is a cross sectional side view of a separator (150) for separation of oil/grease from water according to US 2005/0211620 A1. The separator (150) comprises a tank (14) having an inlet (12) that feeds an oil/water mixture into an inlet chamber. A basket (60) performs coarse filtering of the mixture received through the inlet (12). The separator includes an oil/grease valve (34) which prevents water from entering into an area above a top plate (32). The area above the top plate is used as a sump (166) to store oil/grease. A downward sloping bottom control plate (154) has a V-shape to catch silt. The V-shape bottom control plate (154) transitions into a weir (156), maintaining a V-shape which is slanted upwards to the desired predetermined height to provide hydrostatic pressure on the separated oil at the oil/grease valve (34). A further control plate (158), is coupled to the top of the tank (14) to provide a channel (160) between the further control plate (158) and the weir (156)

through which the separated water flows. A mesh screen (172) is positioned in front of a water outlet (168) to filter out silt which exits the tank (14) by a silt outlet (170). Water exits the tank (14) by the water outlet (168).

A further known separation device is shown by FIG. 3.

FIG. 3 is a cross sectional side view of a separator (12) for separating oils from waste water and solids according to US 2012/0152864 A1. Waste water is drained into a perforated baffle tube (24) of the separator (12) via an inlet (22). The length of the baffle tube (24) is sufficient so that, after a resident time therein, the liquefied FOGs rise above the water, exit the baffle tube (24) via perforations in the baffle tube (24) and accumulate in an oil reservoir (40) located at the top of the separator (12), where they are then manually drained off. The waste water and solids, on the other hand, gravitate to the bottom of the baffle tube (24), exit the baffle tube (24) via the perforations and collect in the bottom (16) of the separator (12). A collection head (48) is located at the bottom (16) of the separator (12) and is adapted for suctioning the waste water and the solids therein.

However, with the aim of reducing their FOG emissions and/or making FOGs easier to remove from cooking equipment and surfaces, many commercial or industrial kitchens and catering establishments introduce biological and/or chemical detergents to their waste water before it exits the establishment. Such establishments may also employ mechanical processes (such as whisking and blending) during food preparation. These mechanical processes can mechanically emulsify FOG/water mixtures.

Similarly, it is common to use detergents in household kitchens to remove FOGs from equipment and surfaces. For example, detergent is generally added to dishwashers before the dishwashing cycle begins in the form of solid detergent capsules or liquid detergent tablets. Liquid detergents are often added to water when washing dishes in a sink or when wiping down food preparation surfaces. Detergents employ surfactants to help enhance the emulsification of FOG droplets.

Biological and/or chemical detergents can be used in combination with a suitable FOG/water separator and can be added before the waste water enters the FOG/water separator, whilst the waste water is in the FOG/water separator, or after the waste water has exited the FOG/water separator. In general detergents are added to the waste water before it enters the FOG/water separator. For example, the detergents added to dishwashing machines before the dishwashing cycle begins will generally be present in the waste water exiting the dishwashing machines after the dishwashing cycle has ended.

Biological, chemical and/or mechanical emulsification produces small FOG droplets which do not separate easily under gravity and, as such, are much more difficult to remove from contaminated water. An emulsion is a suspension of FOG globules dispersed in water.

For example, mechanically emulsified FOG droplets tend to have a droplet size of between 20 μm and 150 μm and are defined as a "micro-emulsion moderate". These micro-emulsion moderate FOGs have a separation time in the region of hours. Similarly, chemically emulsified FOG droplets tend to have a droplet size of between 1 μm and 20 μm are defined as "micro-emulsion strong". These micro-emulsion FOGs and have a separation time in the region of days [2]. FOG droplets having a droplet size of ≤1 μm are defined as "micro-emulsion very strong" and are almost impossible to separate from water using gravity alone.

Furthermore, the addition of detergent may cause a mixture of FOG types having a range of densities form within the water. Some of the FOGs may have higher densities than the surrounding water. These FOG types are herein called "high density FOGs".

High density FOGs may be created, for example, when FOGs join with detergent molecules. High density FOGs will not generally float on water and will instead sink in the water. As such, high density FOGs cannot be removed from the water using conventional FOG/water separators which primarily rely on the FOGs floating on top of the water before using various techniques, such as skimming, to then remove the floating FOGs from the water surface.

Water has an approximate density of 100 kg/m³. However, the average density of water can be higher or lower than this depending on its temperature; the density of water decreases as its temperature increases.

Relative density is the ratio of the density of a substance to the density of a given reference material. Specific gravity is the relative density measured with respect to water. For the purposes of this disclosure, low density FOGs are considered to have an average density of less than 100 kg/m³ and a specific gravity of less than 1. High density FOGs are considered to have an average density of more than 100 kg/m³ and a specific gravity of more than 1.

A FOG/water emulsion may also form when the FOG/water mixture is above a certain temperature.

Therefore, an emulsion of FOGs having a range of different densities and sizes cannot be easily separated and removed from water using conventional FOG/water separators.

The present invention has been devised in light of the above considerations.

SUMMARY OF THE INVENTION

The present invention relates to a filter, a device and a method for removing FOGs from wastewater contaminated by FOGs, wherein the waste water may be produced in a commercial or industrial kitchen or in a household kitchen.

In a first aspect of the invention, there is provided a filter for removing fats, oils and/or grease ("FOGs") from water, the filter comprising:

a first perforated layer;

a second perforated layer adjacent to the first perforated layer, the second perforated layer comprising polyester;

a third perforated layer adjacent to the second perforated layer, the third perforated layer comprising polyester impregnated with carbon;

a fourth perforated layer adjacent to the third perforated layer, the fourth perforated layer comprising granular activated carbon bonded together and wrapped in polyester; and a fifth perforated layer adjacent to the fourth perforated layer;

wherein all of the layers are encased by a perforated casing, such that, in use, water flows through the casing and all of the layers of the filter and FOGs are removed from the water.

Preferably, the layers are ordered such that water flows through the first layer, the second layer, the third layer, the fourth layer and then the fifth layer, in this order.

Preferably, the fourth layer has pores having a smaller average pore diameter than the pores of the third layer, and the third layer has pores having a smaller average pore diameter than the pores of the second layer.

In this way, progressively smaller FOG molecules are removed by each layer of the filter, such that water exiting the filter has a zero or negligible FOG concentration.

In use, waste water passes through the pores of the perforated casing and initially comes into contact with the first layer of the filter.

Preferably, the casing is formed from stainless steel having multiple pores. The pores allow water to flow through the casing and into the first layer of the filter. The pores of the casing are sized to prevent large molecules from entering the filter, so that such large molecules do not block the layers of the filter.

Because the filter casing is made from stainless steel, the casing does not rust in water. Therefore, the casing provides the filter with a protective outer layer.

The first layer and the fifth layer provide structural support to the remaining layers of the filter.

Preferably, each of the first layer and the fifth layer are formed from multiple strands of pre-galvanised steel, wherein each strand has a diameter of 1.3 mm. Pre-galvanised steel is steel which is galvanised before the layer is formed.

Forming the first layer and the fifth layer from multiple strands of pre-galvanised steel creates multiple holes or pores in each layer. In this way, the first layer is able to capture and filter out larger molecules, including organic compounds/molecules and larger FOG molecules. By capturing these larger molecules, the first layer prevents these larger molecules from coming into contact with subsequent layers of the filter. This prevents the inner layers of the filter, which have smaller pore sizes than the first layer, from being blocked quickly by these larger molecules, leaving the subsequent layers of the filter available to capture the smaller molecules, which are more difficult to capture than the larger molecules. The pores of the fifth layer allows clean water to pass through and out of the filter.

Preferably, each of the pores of the first layer and/or the fifth layer has a length of 5 mm and a height of 3.5 mm. This pore size has been found to be optimal for capturing larger molecules without restricting or slowing down the flow of water through the filter.

Preferably, each of the first layer and the fifth layer are coated in a layer of DX53D+Z140. DX53D is a non-ageing steel which provides protection to the layers, such that the properties of these layers remain largely unaltered during at least six months of use. Z140 is a zinc-based coating, comprising >99% zinc. The Z140 coating acts to protect the first layer and the fifth layer from corrosion. The Z140 coating also creates a fine crystallized spangle which makes the filter layers visually appealing.

The resulting DX53D+Z140 coating provides corrosion protection to the layer it is applied to, and in particular, helps to protect deformed or bent areas of the layer which would, otherwise, be susceptible to corrosion. In addition, the DX53D+Z140 coating is lead free, which makes it suitable for coating filter components intended for use within a water supply.

Preferably, each of the first layer and the fifth layer have a total thickness of 0.7 mm. The inventors have found that this layer thickness provides optimal structural support to the remaining layers of the filter, whilst making production economical.

In use, waste water passes through the pores of this first layer which removes larger molecules from the waste water. The waste water then comes into contact with the second layer of the filter.

Preferably, the second layer of the filter is formed from non-woven thermally bonded polyester. This second layer is, itself, a layered structure, comprising multiple layers of thermally bonded bi-component fibres. The number of layers making up this second layer is chosen so as to ensure optimal separation of FOG molecules and organic contaminants from waste water.

The layers of non-woven thermally bonded polyester of the second layer are able to effectively trap and remove larger FOG molecules from the water. For example, the inventors have found that the second layer is able to remove FOG molecules having a droplet diameter of greater than or equal to 1 μm and less than or equal to 50 μm.

Preferably, the second layer of the filter has a total thickness in the length direction (FL) of 5 mm. The inventors have found that this layer thickness provides for optimal separation of larger FOG molecules from waste water, whilst keeping the production costs of the filter economical.

Next, the waste water flows from the second layer and comes into contact with the third layer of the filter. The third layer is impregnated with carbon which traps and removes smaller FOG molecules from the water. For example, the third layer is able to remove FOG molecules and other organic contaminants having a diameter of greater than or equal to 1 μm and less than or equal to 20 μm. Molecules having this size range include odour molecules and/or small organic contaminants. The presence of powdered carbon helps to eliminate odours.

The third layer is also capable of removing larger FOG molecules (having a diameter of up to 50 μm, for example), if the previous layers (the first and/or the second layers) of the filter are not working at their optimal capacity (towards the end of the filter's lifespan some of the layers may become blocked). However, this third layer will become blocked quickly by larger FOG molecules. Therefore, to maintain optimal performance, the filter should be replaced regularly, before any of the layers become blocked.

Preferably, the third layer is formed from at least 100 g of polyester per square meter of surface area of the third layer, and is impregnated with at least 68 g of carbon per square meter of surface area of the third layer. The carbon is preferably in powdered form.

The components of this layer and have been selected by the inventors to maximise the ability of the layer to remove molecules from waste water, whilst permitting an optimal volume of waste water to flow through the filter. In particular, the presence of carbon in this layer helps to eliminate odours.

Preferably, the third layer has a total thickness of 6 mm. The inventors have found that this layer thickness provides for optimal separation of FOG molecules from waste water, whilst keeping the production costs of the filter economical.

Next, the waste water flows from the third layer and comes into contact with the fourth layer of the filter.

The fourth layer comprises granular activated carbon (GAC) pieces bonded together and wrapped in polyester. As such, the fourth layer is an activated carbon filter.

Preferably, the GAC is formed from multiple small coal granules bonded together by adhesive.

Preferably, the coal granules have a range of diameters from 3.35 μm to 1.70 mm.

The coal granules undergo an activation process to form numerous pores distributed randomly within the material. This type of GAC has a very large surface area, due to the high number of pores formed by the activation process.

The GAC is able to remove FOGs from water by adsorbing the FOGs onto the surfaces of the GAC as water contaminated by FOGs passes through the pores of the GAC.

Preferably, the GAC pieces are bonded together by adhesive.

The adhesive used to bond the GAC pieces together means that the filter is able to maintain its structural integrity and operate effectively in water having a temperature of up to 60° C. Given that the filter of the present disclosure is intended for use in a kitchen, it is desirable that the filter is able to operate at high water temperatures.

The efficacy with which the GAC removes contaminants from water is dependent, in part, on the size of its pores. Smaller pores are more efficient at removing contaminants from water. However, a compromise must be sought because smaller pores reduce the rate at which water is able to pass through the filter and can become easily clogged by larger contaminants.

The efficacy with which the GAC removes contaminants from water is further dependent, in part, on the speed with which the water passes through the filter. The slower the water passes through the filter, the more effective the filter is at removing contaminants because the contaminants are exposed to the filter fora longer time.

However, if water flows through the filter too slowly, an unmanageable back-log of waste water may occur within the device and/or the kitchen.

Preferably, the GAC has pores with a diameter of less than or equal to 100 µm, but greater than or equal to 2 µm.

This pore diameter is large enough so as not to be blocked by larger FOG droplets, but small enough to capture a large proportion of remaining FOG droplets present in the water.

It is estimated that the FOG droplets remaining in the waste water after passing through the first, second and third filter layers will have a droplet size of greater than 0 µm and less than or equal to 20 µm. Therefore, a fourth layer comprising an activated carbon filter having pores with a diameter of less than or equal to 100 µm and greater than or equal to 2 µm will be able to remove a high proportion of the remaining FOG droplets.

Hence, as water passes through the pores of the GAC of the fourth layer, a majority of the FOG droplets present in the water will be adsorbed and trapped by the granular activated carbon and removed from the water.

After passing through the fourth layer, the water comes into contact with the fifth layer. The fifth layer has the same properties as the first layer described above and provides structural stability to the remaining layers.

A second aspect of the invention is a device for removing FOGs from water including a filter according to the first aspect of the invention. Hence, the device of the second aspect of the invention may make use of the filter of the first aspect of the invention having any feature or combination of features described in connection with the first aspect of the invention.

In the second aspect of the invention, there is provided a device for removing FOGS from water, the device comprising:

an inlet for receiving water contaminated by FOGs into the device;

a separator for removing FOGs from water, wherein the separator removes the FOGs that separate from the water under gravity;

a filter according to the first aspect of the invention, wherein the filter removes the FOGs remaining in the water after the water has passed through the separator;

a flow passage for fluidly connecting the separator to the filter; and a water outlet for emitting the water once a majority of FOGs have been removed.

Preferably, the waste water is initially passed through a food separation basket to remove large food particulate. The waste water then enters the device according to a second aspect of the invention and described herein.

In operation of the device according to the second aspect, a continuous supply of water contaminated by FOGs enters the device through the inlet of the device, and a continuous supply of water is emitted from the device by the water outlet once a majority of FOGs have been removed from the water by the separator and the filter. Water that is emitted from the water outlet has a near zero, or negligible, concentration of FOGs, and is herein referred to as "clean water". When operating effectively, "clean" water may be emitted from the water outlet having a FOG concentration of less than 100 ppm. This means that for every 1 million water molecules emitted by the device, there are less than 100 FOG molecules. Preferably the clean water emitted from the water outlet has a zero or negligible FOG concentration.

After exiting the device, the clean water is able to exit the kitchen or catering establishment by the standard drainage and sewerage systems.

To achieve a near zero or negligible concentration of FOGs in the emitted water, the device requires both a filter and a separator.

The separator alone is not able to remove all of the FOGs from water. The separator operates (as discussed herein) by removing low density FOGs that have separated from the water and then float on top of the water. Therefore, the separator is only able to remove FOGs that separate under gravity with a short separation time. For example, FOG droplets having a droplet size of ≥150 µm are able to separate from water under gravity with a separation time of ≤10 minutes. Furthermore, the separator is only able to remove FOGs that are less dense than the surrounding water and hence float on top of the water.

Therefore, the separator will not be able to remove small FOGs that do not readily separate from water, nor will the separator be able to remove high density FOGs which, though they may readily separate from the water, as they are more dense than the surrounding water, they will sink below the water.

The filter is able to remove most types of FOGs from water as described above. However, if used without the separator, the filter will become blocked quickly by the high concentration of FOGs in the water.

Therefore, it is preferable that a separator and a filter are used in combination to achieve a near zero or negligible concentration of FOGs in the emitted water.

In a first arrangement, the device may comprise a tank separated by a vertical wall into a separator chamber and a filter chamber. The vertical wall comprises at least one aperture defining a flow passage for fluidly connecting the filter chamber to the separator chamber. The flow passage may be a hole, a slot, a gap or another form of aperture in the vertical wall that is capable of allowing water to pass from the separator chamber and into the filter chamber.

In a second arrangement, the device may comprise a separator chamber and a filter chamber, wherein the separator chamber and the filter chamber are not contained within a shared tank and are instead two individual tanks spaced apart from each other. In this configuration, the separator chamber and the filter chamber are fluidly connected to each other by a flow passage and the flow passage may be a pipe, a tube, a channel, a conduit or another form of passageway capable of transporting water from the separator chamber and into the filter chamber.

With the second arrangement, the filter chamber may be added to the back end of an existing compatible separation device. In this case, the filter chamber is self-contained.

The filter is positioned downstream of the separator. The direction of water flow is from the inlet and towards the water outlet. Therefore the term "downstream" means that the filter is positioned closer to the water outlet than the separator, and the separator is positioned closer to the inlet than the filter. In other words, the separator is positioned between the filter and the inlet and the filter is positioned between the separator and the water outlet.

In this way, water contaminated by FOGs entering the device via the inlet flows through the separator first and then through the filter. The separator removes a portion of FOGs from the water first, meaning that the filter is then able to remove the remaining FOGs from the water without becoming blocked by the low density FOGs.

As mentioned above, it is preferable that the filter is enclosed by a filter chamber having a first side wall and a second side wall opposite the first side wall. In this configuration, preferably:

the flow passage is in the first side wall of the filter chamber and is located above a top of the filter; and the water outlet is in the second side wall of the filter chamber and is located opposite a middle; portion of the filter.

This configuration allows clean lighter water to pass from the flow passage, over the top of the filter and out of the water outlet, whilst directing the high density sunken FOG droplets through the filter to remove the remaining FOG droplets and allow clean water to be emitted from the device.

In the first arrangement discussed above, the first side wall of the filter chamber corresponds to the vertical wall of the tank, and the second side wall of the filter chamber corresponds to the second side wall of the tank.

In this way, the filter is able to effectively remove difficult to remove FOGs from water.

In particular, the filter is able to remove sunken high density FOGs as follows.

In operation, water contaminated by FOGs continuously enters the inlet and passes through the separator first, which continuously removes a majority of the low density FOGs from the water. On exiting the separator, water which is still contaminated by the remaining FOGs flows from the separator chamber and into the filter chamber via the flow passage. The contaminated water then passes into the filter chamber wherein the filter continuously removes a majority of the remaining FOGs from the water.

When given a sufficient amount of time in the filter chamber, the high density FOGs sink downwards in the water towards the bottom of the water and the bottom of the filter chamber. Because the filter is positioned within the first side wall of filter chamber at a level below the flow passage, water contaminated by sunken high density FOGs will preferentially pass through the filter, whereas clean water will travel straight through the filter chamber without passing through the filter. This clean water will be emitted from the filter chamber via the water outlet. Water that has passed through the filter will also be emitted from the filter chamber via the water outlet.

Consequently, all of the water that enters the device will pass through the separator, but not all of the water that enters the device will pass through the filter. Advantageously, the water outlet is able to start emitting clean water after a shorter amount of time than if all of the water passed through the filter before being emitted from the device.

Preferably, the first side wall and the second side wall of the filter chamber are opposite each other and the filter is not in contact with the first side wall or the second side wall of the filter chamber.

Having a space between the first side wall and the filter means that the entire surface of the filter that faces the first side wall of the filter chamber is exposed to the inside of the filter chamber. This means that there is a large surface area of filter available to come into contact with the contaminated water. In particular, the position of this surface directly opposite the flow passage means that it is able to come into direct contact with sunken high density FOGs and the water surrounding them.

Similarly, having a space between the second side wall and the filter means that the entire surface of the filter that faces the second side wall of the filter chamber is exposed to the inside of the filter chamber. This means that there is a large surface area of filter available for clean water to pass out of the filter. In particular, the position of this surface directly opposite the outlet means that clean water passing out of the filter is able to flow freely from this surface and out of the water outlet.

Preferably, the filter is in contact with the base of the filter chamber. This means that sunken high density FOGs are forced to pass through the filter as they cannot pass underneath it.

Preferably, the filter chamber comprises a third side wall and a fourth side wall opposite the third side wall, wherein the third side wall and the fourth side wall are perpendicular to the first side wall and the second side wall, and the filter is in contact with the third side wall and the fourth side wall of the filter chamber.

This arrangement of the filter in the filter chamber means that water contaminated by sunken high density FOGs is forced to pass through the filter. There is no space between the base of the filter and the filter chamber, meaning that water contaminated by sunken high density FOGs is not able to flow underneath the filter. Similarly, there is no space between the filter and the third wall of the filter chamber, and the filter and the fourth wall of the filter chamber, meaning that water contaminated by sunken high density FOGs is not able to flow around either side the filter.

The filter may be held in this position in the filter chamber by affixing a bottom side of the filter to the base of the filter chamber using a suitable adhesive.

Alternatively, the filter is held in the filter chamber by a perforated filter holder. In this way, the position of the filter is maintained as water passes through the filter chamber. The filter holder is perforated to allow water contaminated by high density FOGs to flow through the filter holder and then come into contact with the filter. The perforations in the filter holder may be 0.5 mm in diameter. However, the perforations in the filter holder may be any suitable diameter.

The filter holder may surround the filter on all sides. Alternatively, the filter holder may not surround a top side of the filter. The filter holder defines a space for receipt of the filter. This makes it easy for the filter to be removed and replaced with a fresh filter. In this configuration, the filter holder may have a removable lid to keep the filter securely in place during operation, but making it possible for the filter within the filter holder to be replaced if necessary.

The filter holder may also include a removable tray at the bottom of the filter holder and positioned underneath the filter when in the filter holder. The removable tray is positioned to catch silt or other debris that may be held in the suspended FOG droplets. The tray can be removed, cleaned and replaced periodically.

Here, the filter is a filter according to the first aspect of the invention.

Generally, a filter is a porous device that is able to remove impurities from a liquid or gas as the liquid or gas is passed through the filter. The filter may be suitable for removing both low density and high density FOGs from water. However, the filter is preferably positioned in the device as discussed above so that only water contaminated by high density FOGs pass through the filter. The filter removes FOGs from water by adsorbing the FOGs to the surfaces of the filter as water passes through the filter.

The filter comprises several perforated layers. As water passes through the pores in the layers of the filter, any FOGs present in the water will be trapped and removed from the water such that clean water is emitted from the filter.

The separator of the device may be a conventional FOG/water separation device. Examples of conventional FOG/water separation devices are discussed in the background section of this disclosure, but any suitable conventional FOG/water separation device may be used.

However, preferably, the separator of the device comprises a separator chamber comprising:

an upright weir plate within the separator chamber and extending the width of the separator chamber from the base of the separator chamber to terminate at a level below the top of the separator chamber, wherein the upright weir plate divides the separator chamber into a separator inlet chamber and a separator outlet chamber;

an upright control plate located in the inlet chamber and extending the width of the separator chamber, the bottom of the upright control plate being located above the base of the separator chamber to define a slot between the control plate and the base of the separator chamber, the top of the upright control plate being at or above the level of the top of the upright weir plate; and a top plate capping the part of the inlet chamber to a side of the upright control plate remote from the upright weir plate, said top plate having an apex within the separator inlet chamber positioned below the level of the top of the upright weir plate, the apex having an aperture for emitting low density FOGs;

wherein the inlet of the device is positioned at a level below the top plate of the separator;

the flow passage is positioned at a level below the top of the weir plate; and a riser tube extends upwardly from the aperture in the top plate to a level above that of the top of the upright weir plate.

In operation, a continuous supply of water contaminated by FOGs enters the device through the inlet and begins to fill the separator inlet chamber of the device. As the inlet is positioned at a level below the level of top plate of the separator, the water contaminated by FOGs is contained in a lower chamber of the separator inlet chamber, wherein the lower chamber is located below the top plate.

When given a sufficient amount of time in the lower chamber of the separator chamber, the low density FOGs floats upwards in the water towards the top of the water and a low density FOG/water interface is created below the top plate.

On the continuous supply of contaminated water into the inlet chamber, the low density FOG/water interface rises until the low density FOGs enter the riser tube via the aperture in the apex of the top plate. The low density FOGs are continuously emitted from the device via a low density FOG outlet which is fluidly connected to the aperture in the apex of the top plate. Once emitted, the low density FOGs are collected and disposed of.

The device may further comprise a low density FOG storage unit connected to the low density FOG outlet for storing emitted low density FOGs until they can be collected and disposed of.

At the same time, on the continuous supply of contaminated water into the separator inlet chamber, water containing any remaining FOGs is forced from the lower chamber of the separator inlet chamber and through the slot between the control plate and the base of the tank, over the top of the weir plate, into the separator outlet chamber, through the flow passage and into the filter chamber of the device. The filter chamber then removes the remaining FOGs from the contaminated water as described above.

In the event that there is a surge in the supply of contaminated water into the separator inlet chamber, the low density FOG/water interface will rise and there will be a tendency for water to enter the riser tube through the aperture in the top plate.

In order to prevent this, preferably, the riser tube comprises a one-way valve positioned in the riser tube and arranged to prevent flow of water through the riser tube.

Preferably, the one-way valve is a ball valve incorporating a float which, with low density FOGs in the riser tube, keeps the riser tube open, and, with water in the riser tube, closes the riser tube.

Preferably, the top plate is integral with or secured to the control plate and is of a generally inverted V-shape in transverse section, with the apex of the transverse section extending upwardly and inwardly of the separator chamber from a region adjacent the inlet, to a region of integration of the top plate with the upright control plate.

In addition, it is preferable that the aperture in the top plate is adjacent to the region of integration of the top plate with the upright control plate.

It has been founds that this shape of control plate and aperture position effectively channels the low density FOGs from the inlet and towards the aperture in the top plate, where they can be emitted from the device.

Preferably, an outlet tube feeds substantially horizontally from the riser tube at a level above that of the top of the upright weir plate. The level of the outlet tube dictates the water level within the device and creates a hydrostatic pressure within the device that assists in the faster separation of low density FOGs from the water.

A third aspect of the invention provides a method of using the device according to the second aspect of the invention. Hence, the method may make use of the device of the second aspect of the invention having any feature or combination of features described in connection with the second aspect of the invention.

Similarly, as the second aspect of the invention provides a device including a filter according to the first aspect of the invention, the method according to the third aspect of the invention may make use of the filter of the first aspect of the invention, having any feature or combination of features described in connection with the first aspect of the invention.

The third aspect of the invention may therefore provide a method of using a device for removing FOGs from water according to the second aspect of the invention, wherein water contaminated by FOGs is preferably received by the inlet at a flow rate of 1.5 litres per second.

The flow rate that water contaminated by FOGs enters the device by the inlet may be chosen so that water is able to enter the device at a flow rate which is useful for a commercial, or industrial kitchen or catering establishment or a household kitchen. In other words, the flow rate of waste water that the device is able to accept is chosen depending on where the device is to be used. For example, if the device is to be used in a commercial, or industrial kitchen or catering establishment, the device must be able to accept and remove FOGs from the large volumes of waste water that may be produced in such an establishment. If the device is to be used in a household kitchen, the device must be able to accept and remove FOGs from smaller volumes of waste water that may be produced in a household kitchen.

The waste water must be permitted to pass through the device at a speed that prevents an unmanageable back-log of waste water accumulating in the device and/or the kitchen.

In a commercial kitchen, it is estimated that water contaminated by FOGs is produced at a flow rate of approximately 1.5 litres per second. Therefore, the device is configured to receive contaminated water at a flow rate of 1.5 litres per second. In this way, the device is suitable for use in a commercial kitchen. However, the inventors of the device envisage that different sized devices could be produced on an ad hoc basis depending upon the volume or waste water produced by the establishment.

The average volume of waste water produced by a restaurant is 500 litres per square foot of the restaurant. Whilst a domestic house produces approximately 600 litres per person per day.

As the filter removes FOGs from water by adsorbing and trapping the FOGs to the surfaces of the filter, after a period of time the surfaces of the filter become saturated by the FOGs and the filter cannot adsorb any more FOGs. At this point, the filter will need to be replaced with a fresh filter. Preferably the filter is replaced periodically to ensure that the filter in the device is always able to adsorb FOGs from contaminated water.

The filter will need to be replaced more or less frequently depending upon the concentration of FOGs contaminating the water and the volume of waste water passing through the filter. For example, household kitchens may need to replace the filter much less frequently than commercial or industrial kitchen or catering establishments because household kitchens will on average produce a smaller volume of waste water having a lower FOG contamination concentration than commercial or industrial kitchens or catering establishments.

Although the filter, device and method described herein are capable of separating and removing most types of FOGs from contaminated water, preferably, the filter, device and method described herein are employed to separate and remove from water FOGs that are released from animal and/or vegetable products during cooking or food preparation in commercial or industrial kitchens, catering establishments and/or household kitchens.

In particular, the FOGs may be released from vegetable and/or animal products when the vegetable and/or animal products are cooked or otherwise broken down in a commercial or industrial kitchen or catering establishment, or in a household kitchen.

"Cooking" the vegetable and/or animal products may involve using one, or a combination, of the following techniques: heating, baking, roasting, boiling, blanching, poaching or frying the vegetable and/or animal products, or any other available technique.

"Breaking down" the vegetable and/or animal products may involve using one, or a combination, of the following techniques: cutting, chopping, slicing, blending, mashing, pressing, whipping or straining the vegetable and/or animal products, or any other available technique.

The FOGs may comprise at least one, or a combination, of the following released from vegetable and/or animal products: chicken fats, beef fats, duck fats, lamb fats, pork fats, fish oils, butter, margarines, spreads, palm oils, corn oils, rape seed oils, sunflower oils, olive oils, cooking oils, vegetable oils, ice cream, milkshakes, or any other FOGs released from vegetable and/or animal products.

The invention disclosed herein provides a filter, a device and a method for removing FOGs from water. When compared with conventional FOG/water separation devices, the device of the present invention has been found to be superior at removing FOGs from contaminated water and emitting clean water with a near zero, or negligible, concentration of FOGs.

The invention includes the combination of the aspects and preferred features described except where such a combination is clearly impermissible or expressly avoided.

SUMMARY OF THE FIGURES

Embodiments and experiments illustrating the principles of the invention will now be discussed with reference to the accompanying figures in which:

FIG. 9A is a front view of the filter; FIG. 9B is a side view of the filter; and FIG. 9C is a cross-sectional side view of the filter from the same direction as FIG. 9B.

DETAILED DESCRIPTION OF THE INVENTION

Aspects and embodiments of the present invention will now be discussed with reference to the accompanying figures. Further aspects and embodiments will be apparent to those skilled in the art. All documents mentioned in this text are incorporated herein by reference.

Figure 1:
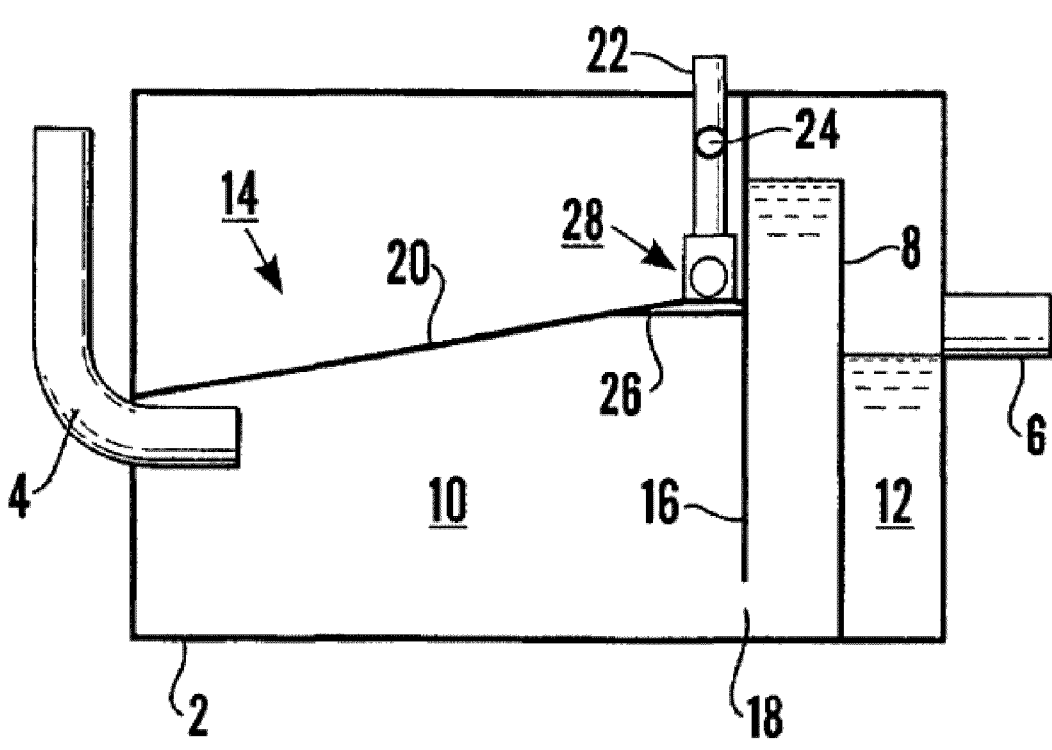
FIG. 1 (PRIOR ART) is a cross sectional side view of a separator for separating immiscible liquids.
Figure 2:
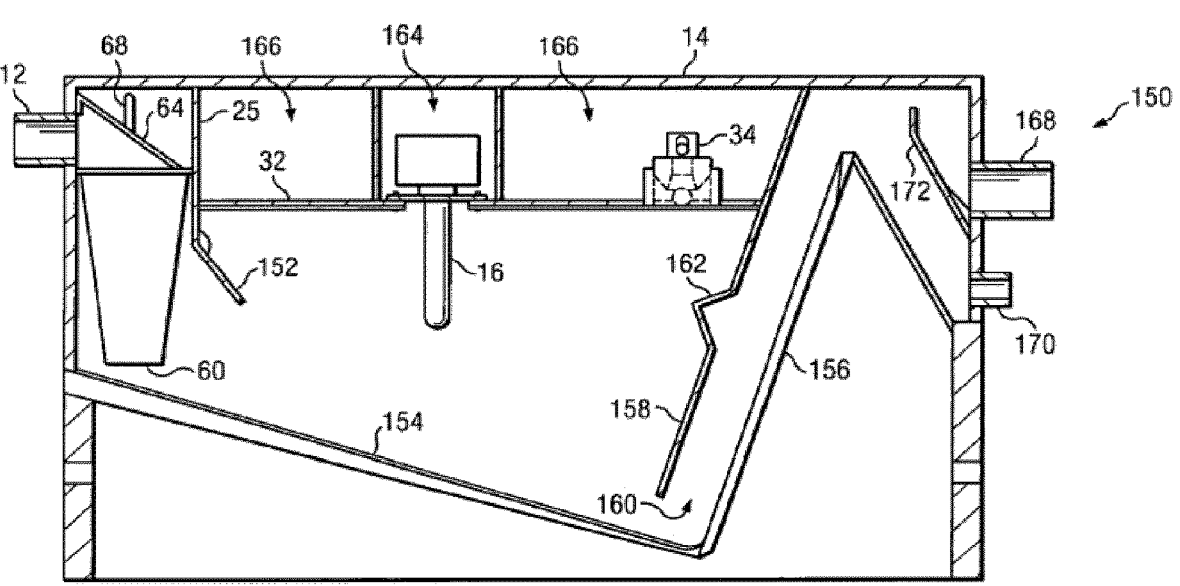
FIG. 2 (PRIOR ART) is a cross sectional side view of a separator for separation of an effluent into constituent parts.
Figure 3:
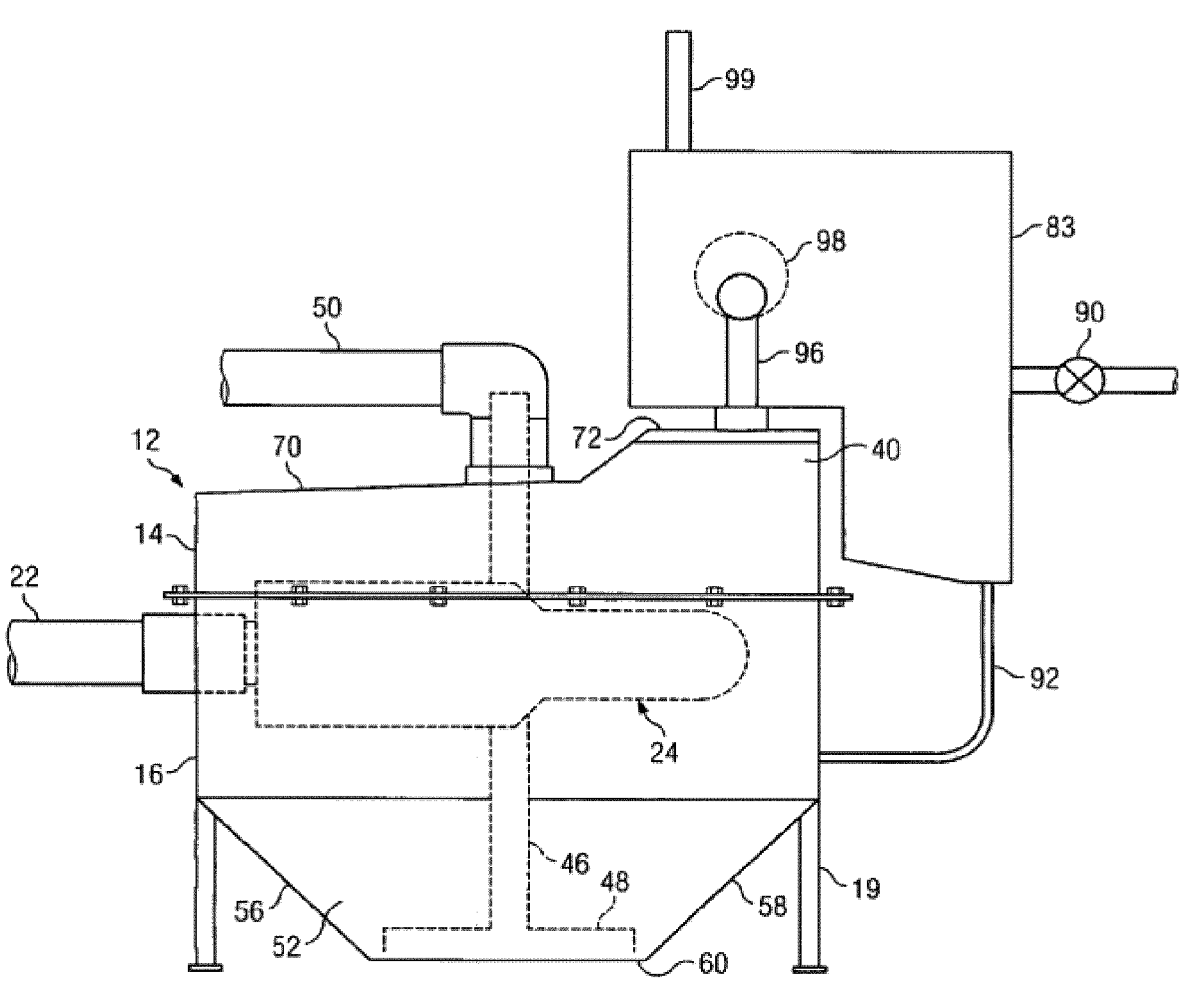
FIG. 3 (PRIOR ART) is a cross sectional side view of a separator for separating oils from waste water and solids.
Figure 4:
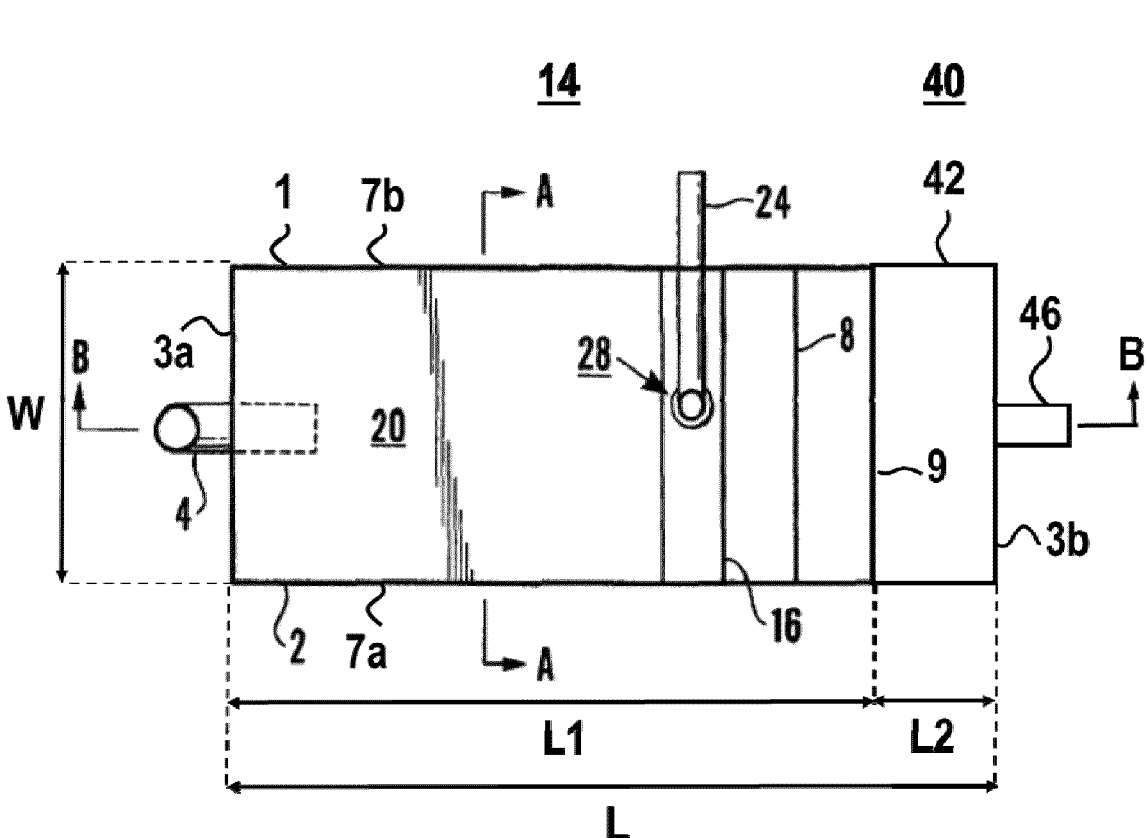
FIG. 4 is a bird's-eye view of a device for removing FOGs from water according to an embodiment of the present invention.
Figure 5:
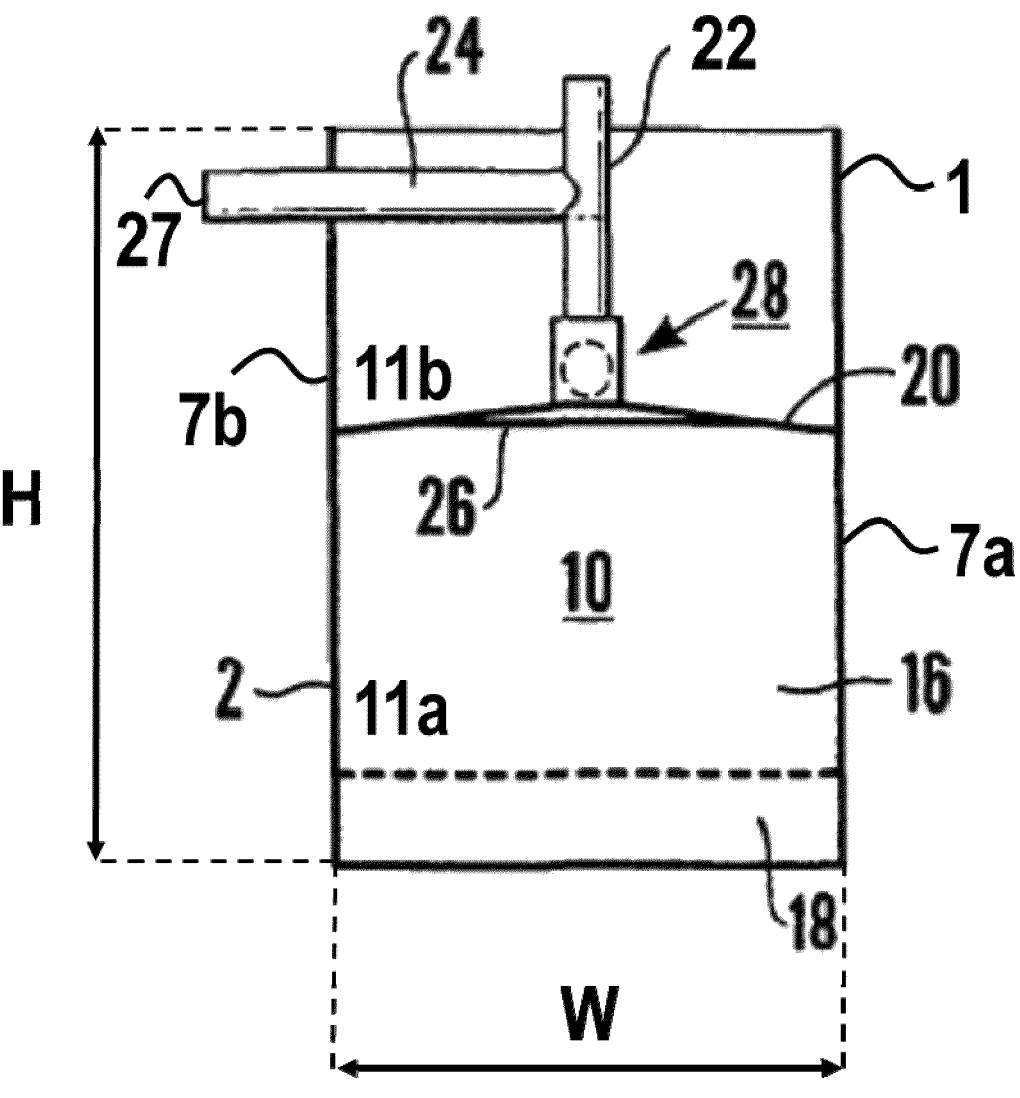
FIG. 5 is cross-sectional side view of the device shown in FIG. 4 at the plane created by transect A-A.
Figure 6:
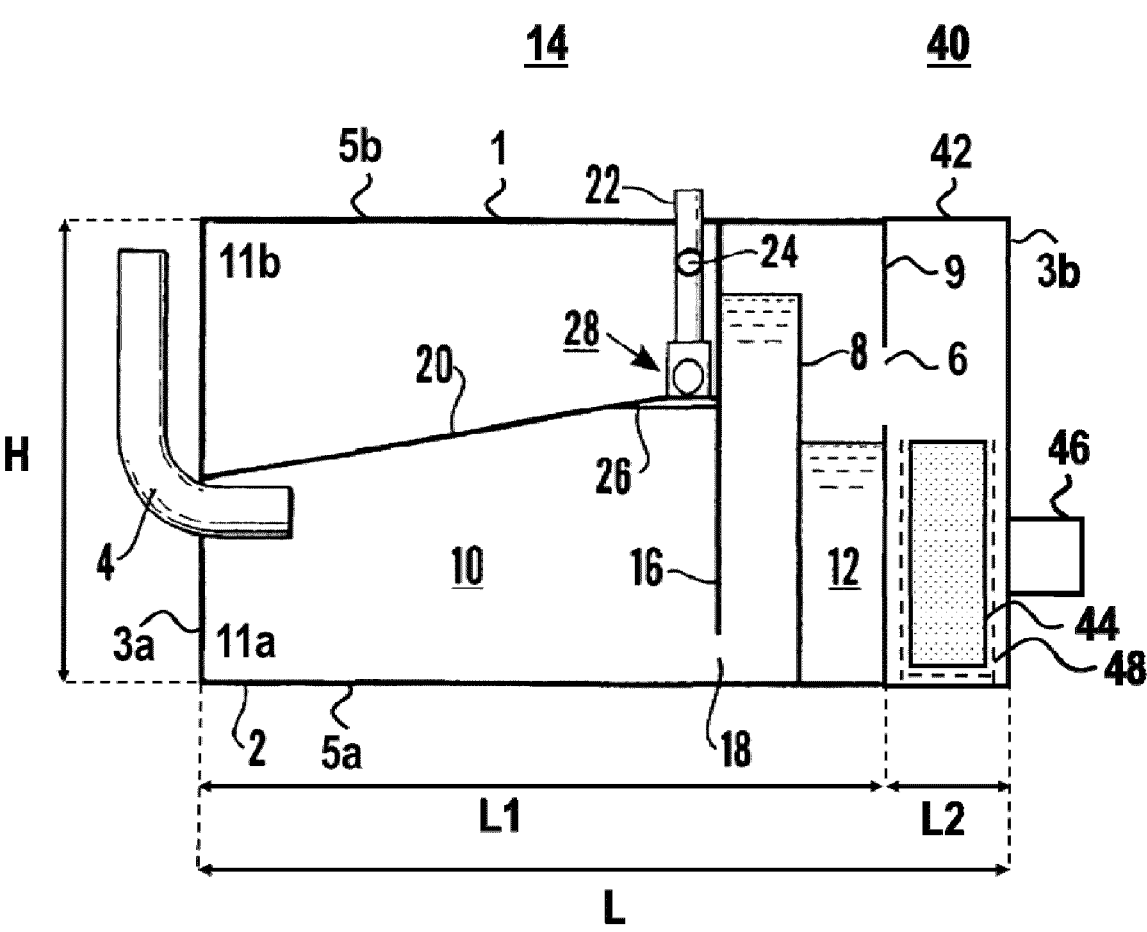
FIG. 6 is cross-sectional side view of the device shown in FIG. 4 at the plane created by transect B-B.

FIGS. 4, 5 and 6 show a device for removing FOGs from water according to an embodiment of the present invention.

FIG. 4 is a bird's-eye view of the device; FIG. 5 is a cross-sectional side view of the device shown in FIG. 4 at the plane created by transect A-A; FIG. 6 is a cross-sectional side view of the device shown in FIG. 4 at the plane created by transect B-B. The planes created by transects A-A and B-B are perpendicular to one another.

As can be seen by FIGS. 4 and 6, the device comprises cuboid tank (1) which is split into a separating portion (14) and a filtering portion (40). The separating portion (14) is able to remove low density FOGs from water by using the property that low density FOGs float on water. The filtering portion (40) is able to remove the remaining FOGs from water such that "clean water" is emitted from the tank (1).

The tank (1) has a first side (3a) and a second side (3b) that are opposite to each other. The distance between the first side (3a) and the second side (3b) defines the total length (L) of tank (1). The total length (L) of the tank (1) is approximately 760 mm.

As can be seen by FIG. 5, the tank (1) has a third side (7a) and a fourth side (7b) that are opposite to each other and perpendicular to both the first side (3a) and the second side (3b) of the tank (1). The distance between the third side (7a) and the fourth side (7b) defines the total width (W) of the tank (1). The total width (W) of the tank (1) is approximately 412 mm.

The tank (1) has a base (5a) and a top (5b), that are opposite to each other and are perpendicular to the first (3a), second (3b), third (7a) and fourth (7b) sides. The distance between the base (5a) and the top (5b) defines the total height (H) of the tank (1). The total height (H) of the tank (1) is approximately 370 mm.

The skilled person would readily appreciate that the tank dimensions given above are merely exemplary and that the length (L), width (W) and height (H) of the tank may be any suitable values. The dimensions of the tank may be modified depending upon the volume of waste water that the tank needs to be able to accept when operating.

The tank (1) is split into a separator chamber (2) defining the separating portion (14) and a filter chamber (42) defining the filtering portion (40) by a vertical wall (9) that extends across the width (W) and the height (H) of the tank (1). The vertical wall (9) is connected to the base (5a), the top (5b), the third side (7a) and the fourth side (7b) of the tank (1). The separator chamber (2) and the filter chamber (42) have the same width (W) and the same height (H) of the tank (1).

The distance between the first side (3a) of the tank (1) and the vertical wall (9) defines the length (L1) of the separator chamber (2).

The distance between the second side (3b) of the tank (1) and the vertical wall (9) defines the length (L2) of the filter chamber (42).

The length (L1) of the separator chamber (2) and the length (L2) of the filter chamber (42) make up the total length (L) of the tank (1).

An inlet (4) is positioned approximately half way up the first side (3a) of the tank (1) and is for receiving contaminated water into the separator chamber (2). The inlet (4) is a hollow pipe of having a diameter that is suitable for connecting to a source of waste water in a commercial or industrial kitchen or catering establishment, or a household kitchen. For example, the inlet (4) may be connected to a drainage pipe of a conventional sink or dishwasher, an ice cream machine or a milkshake machine. As such, the inlet (4) may have an approximate diameter of between 25 mm and 50 mm (1-2 inches) depending on the waste water source present in the kitchen that the inlet (4) is to be connected to.

The vertical wall (9) has an aperture defining a flow passage (6) for fluidly connecting the separator chamber (2) to the filter chamber (42). The flow passage (6) is positioned in the upper half of the vertical wall (9) so as to be above the top of the filter (44) in the filter chamber (42). For example, if the filter (44) has a height of 190 mm and the vertical wall has a height (H) of 370 mm, then the flow passage (6) is positioned more than 190 mm up the vertical wall (9).

The flow passage (6) is for transferring water from the separator chamber (2) into the filter chamber (42).

A water outlet (46) is positioned in the second side (3b) of the tank (1) and is approximately opposite to the flow passage (6) in the vertical wall (9).

The water outlet (46) is for emitting water from the filter chamber (42). The water outlet (46) is a hollow pipe having a diameter that is suitable for connecting to a drainage system in a commercial or industrial kitchen or catering establishment, or a household kitchen. As such, the outlet (46) may have an approximate diameter of between 25 and 50 mm (1-2 inches) depending on the drainage system present in the kitchen that the outlet (46) is to be connected to. For example, the outlet (46) may be connected to a drainage system that leads to a sewerage treatment plant of a village, town or city. Alternatively, the outlet (46) may be connected to a drainage system that leads to water to a septic tank or a holding tank for storage.

The water outlet (46) is positioned in the second side (3b) of the tank (1) so as to be approximately aligned with the middle of the filter (44) in the filter chamber (42). For example, if the filter (44) has a height of 190 mm, then a centre point of the diameter of the water outlet (46) is positioned approximately 95 mm up the second side (3b) of the tank (1).

However, it is preferable that the water outlet (46) is positioned approximately 10 mm lower than this, such that a centre point of the diameter of the water outlet (46) is positioned approximately 85 mm up the second side (3b) of the tank (1). This is to prevent the tank (1) from overflowing if, for example, the filter (44) becomes blocked due to not being replaced regularly enough.

The filter chamber (42) contains a cuboidal filter holder (48) which holds a cuboidal filter (44) as described in detail below. The filter holder (48) is a perforated basket, having 0.5 mm perforations. The perforations allow water to flow freely into the filter holder (48) and then pass through the filter (44). As such, the skilled person would readily appreciate that the perforations in the filter holder (48) may be of any suitable size to allow water to flow freely through the filter holder (48). The filter holder (48) surrounds the filter (44) on five sides and is open on a top side to allow for the filter (44) to be easily replaced.

The filter holder (48) supports the filter (44) and keeps it in position in the filter chamber (42). The filter holder (48) and the filter (44) are in contact with the base (5a) of the tank (1) and extend upwardly from the base (5a) of the tank (1) and towards the top (5b) of the tank (1) to a position spaced slightly below the position of the flow passage (6) as described above. In this way, the filter (44) is positioned in a bottom portion of the filter chamber (42).

Alternatively, the filter holder (48) may extend above the top of the filter (44) and towards the top (5b) of the filter chamber (42). The filter holder (48) may be in contact with the top (5b) of the filter chamber (42), such that the filter (44) is positioned in a bottom portion of the filter holder (48). In this configuration, water not contaminated by high density FOGs is able to pass from the flow passage (6) through the filter holder (48) and out of the filter chamber (42) by the water outlet (46) without passing through the filter (44).

The filter holder (48) and the filter (44) extend between the vertical wall (9) and the second side (3b) of the tank (1), but are not in contact with the vertical wall (9) or the second side (3b) of the tank (1). The filter holder (48) and the filter (44) hence do not extend across the length (L2) of the filter chamber (42). This provides space for water to flow into and out of the filter chamber (42).

The filter holder (48) and the filter (44) extend between the third side (7a) and the fourth side (7b) of the tank (1), and are in contact with both the third side (7a) and the fourth side (7b) of the tank (1). The filter holder (48) and the filter (44) hence extend across the width (W) of the filter chamber (42). This arrangement forces the water contaminated by high density FOGs to pass through the filter.

The filter chamber (42) contains stainless steel guides (not show) which hold the filter holder (48) tightly in place within the filter chamber (42). The stainless steel guides may be present on any of the walls of the filter chamber (42) and parts of the filter holder (48) may slide into the stainless steel guides.

The filter chamber (42) may comprise an area configured for storing water contaminated by high density FOGs for a sufficient time to allow high density FOGs to sink. The area is positioned between the weir (8) and the filter (44) in the filter chamber where the water is stored for a sufficient time to allow the high density FOGs to sink, before then passing through the filter (44).

The filter (44) is a filter according to a further aspect of the present invention and is discussed further below.

Clearly the precise construction of the filtering portion (40) can vary from that described and illustrated. For example the position of the filter (44) in the filter chamber (42) and the type of filter (44) can be altered, provided that the remaining FOGs are removed from the water.

As can be seen by FIGS. 4 and 6, the separator chamber (2) encloses a vertical weir plate (8) that extends between the third side (7a) and the fourth side (7b) of the tank (1) and hence extends across the width (W) of the tank (1). The vertical weir plate (8) also extends from the base (5a) of the tank (1) to a level just below the top (5b) of the tank (1). The vertical weir plate (8) is secured to the third side (7a) and the fourth side (7b) of the tank (1) and to the base (5a) of the tank (1) to divide the separator chamber (2) into a separator inlet chamber (10) and a separator outlet chamber (12). The separator inlet chamber (10) is closer to the inlet (4), whereas the separator outlet chamber (12) is closer to the vertical wall (9).

The separator chamber (2) further encloses a vertical control plate (16) positioned in the separator inlet chamber (10) at a position between the inlet (2) and the vertical weir plate (8). The vertical control plate (16) extends from the third side (7a) to the fourth side (7b) of the tank (1) and hence extends across the width (W) of the tank (1). The vertical control plate (16) is secured to the third side (7a) and the fourth side (7b) of the tank (1). The vertical control plate (16) has a bottom edge which is positioned just above the base (5a) of the separator chamber (2) to define a slot or gap (18) between the vertical control plate (16) and the base (5a) of the tank (1). As can be seen by FIG. 5, the slot (18) extends across the entire width (W) of the tank (1). The vertical control plate (16) extends upwardly to a position above a top edge of the vertical weir plate (8) and preferably connects to the top (5b) of the tank (1).

As shown by FIGS. 5 and 6, the separator chamber (2) further encloses a top plate (20) positioned in the separator inlet chamber (10). The top plate (20) extends from an intermediate position on the vertical control plate (16) towards the first side (3a) of the tank (1), and is secured to the first side (3a) at a position just above the inlet (4). The intermediate position on the vertical weir plate (16) is below the level of the top of the weir plate (8). The top plate (20) is secured to the vertical control plate (16) and to the first side (3a) of the tank (1). The top plate (20) may be integrally formed with the vertical control plate (16).

The intermediate position on the vertical control plate (16) is higher than the inlet (4) on the first side (3a) meaning that the top plate (20) slopes downwardly from the vertical control plate (16) towards the first side (3a) of the tank (1).

The top plate (20) also extends from the third side (7a) to the fourth side (7b) of the tank (1) and hence extends across the width (W) of the tank (1). The top plate (20) is secured to the third side (7a) and the fourth side (7b) of the tank (1) and, hence, separates the separator inlet chamber (10) into a lower chamber (11a) and an upper chamber (11b). The upper chamber (11b) is above the top plate (20) and the lower chamber (11a) is below the top plate (20).

As can be seen by FIG. 5, in the plane created by transect A-A (the "transverse plane") the top plate (20) has a shallow "upside-down V-shape". This "upside-down V-shape" cross section goes from where the top plate (20) contacts the vertical control plate (16) to where it contacts the first side (3a) of the tank (1). The apex of the "upside-down V-shape" is near the middle of the width (W1) of the separator chamber (10). The height of the apex slopes downwardly in a direction from the vertical control plate (16) towards the first side (3a) of the tank (1), as shown by FIG. 6.

Figure 7:
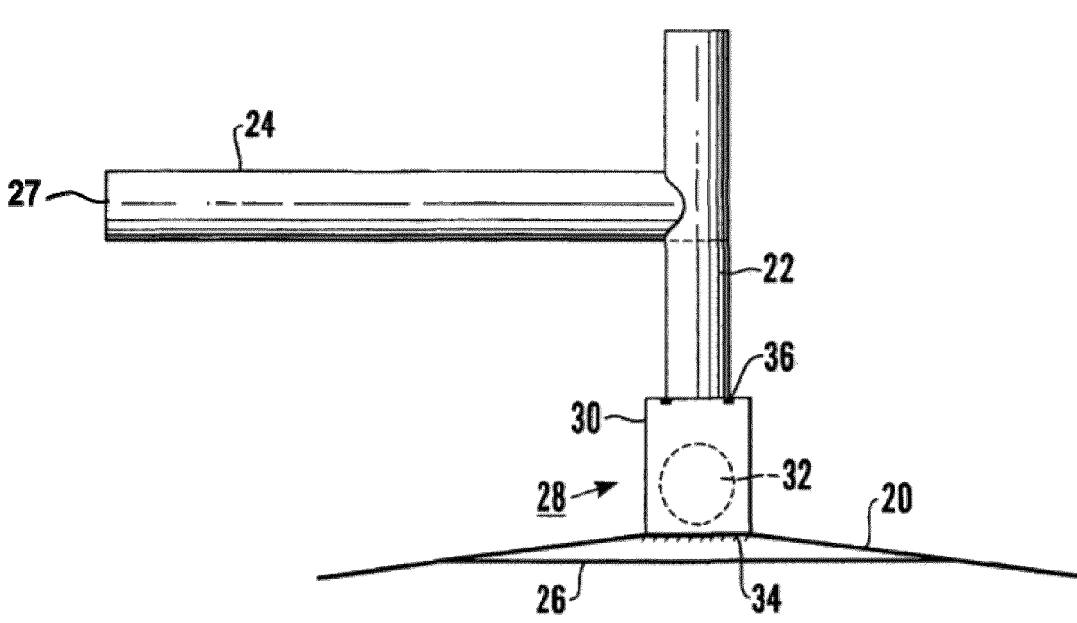
FIG. 7 is a cross sectional side view of a FOG outlet of the device shown in FIGS. 4 to 6.

The separator chamber (2) further comprises a low density FOG outlet (27) as shown by FIG. 7. In particular, the low density FOG outlet (27) comprises a vertical riser tube (22) connected to an aperture formed at the highest apex of the "upside-down V-shape" of the top plate (20), and a horizontal outlet tube (24).

The aperture is positioned in the top plate (20) adjacent to where the top plate (20) connects to the vertical control plate (16). The aperture is in fluid communication with the riser tube (22). The riser tube (22) extends upwardly from the top plate (20). The horizontal outlet tube (24) extends approximately horizontally from the riser tube (22), at a level above that of the top of the vertical weir plate (8) in a direction towards the fourth side (7b) of the tank (1). The horizontal outlet tube (24) is approximately perpendicular to the first side (3a) and the second side (3b) of the tank (1).

The low density FOG outlet (27) further comprises a control valve (28). The control valve (28) is a one-way valve positioned in the lower regions of the riser tube (22) that prevents flow of water into the low density FOG outlet (27).

The control valve (28) comprises a cylindrical housing (30), the bore of which interconnects the aperture in the top plate (20) with the riser tube (22). A ball float (32) is located within the housing (30). The ball float (32) floats in water, but sinks in low density FOGs.

The ball float (32) is retained in the housing (30) by means of a mesh sheet (34) which extends across a lower end of the housing (30) and over the aperture in the top plate (20). A sealing ring (36) surrounds the bore of an upper end of the housing (30) at a position where the housing (30) connects to the riser tube (22). When the sealing ring (36) is engaged with the ball float (32), flow from the housing (30) into the riser tube (22) is prevented. Operation of the control valve (28) is further described below with reference to FIG. 8.

Clearly the precise construction of the separating portion (14) can vary from that described and illustrated. For example the position of the aperture in the top plate (20) and the configuration of the top plate (20) can be altered, provided that the separated low density FOGs are guided towards the low density FOG outlet (27) to be emitted from the device.

Figure 8:
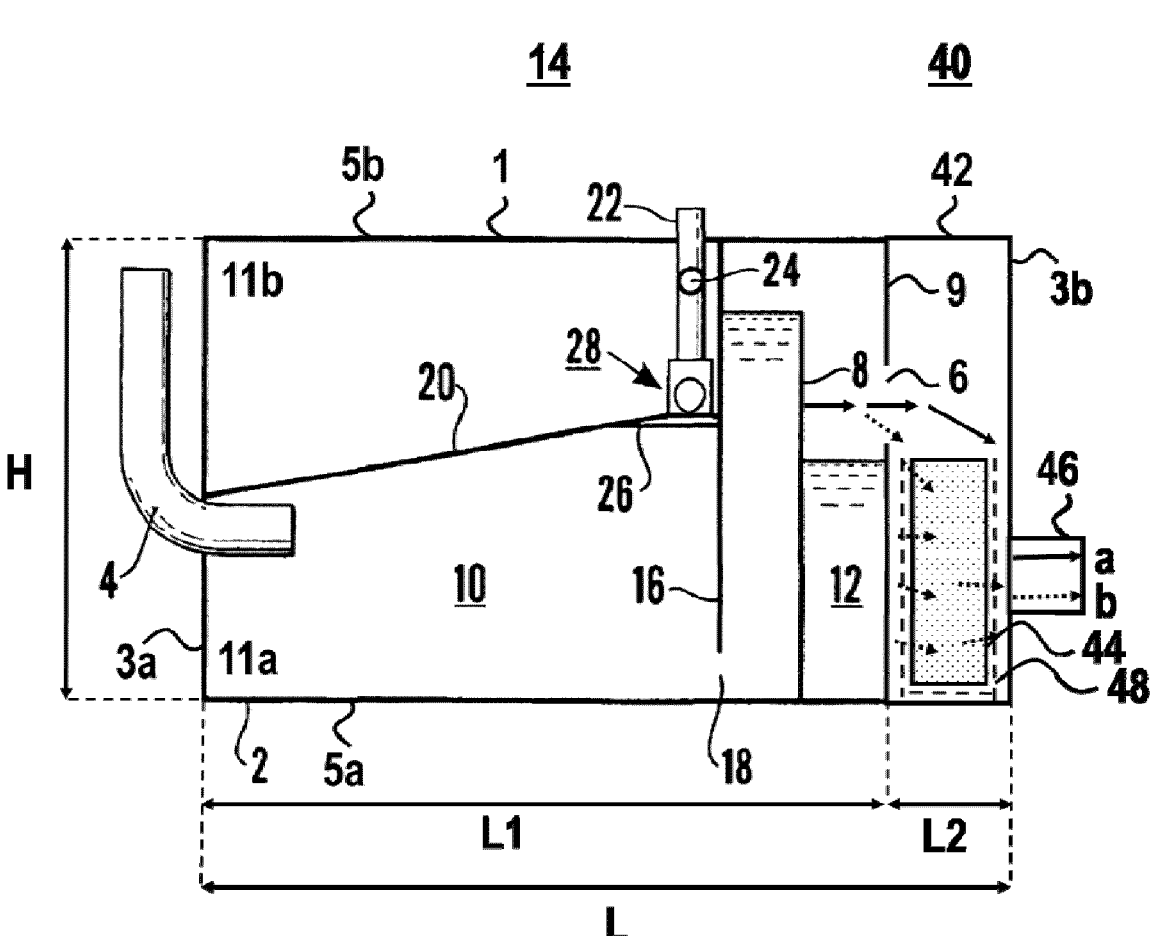
FIG. 8 is a cross sectional side view of a device shown by FIGS. 4 to 7, showing schematically: a) a possible path taken by water not contaminated by high density FOGs (block arrows; labelled "a"); and b) a possible path taken by water contaminated by high density FOGs (broken arrows; labelled "b")

FIG. 8 is a cross sectional side view of the above-described device in operation, showing schematically: a) a possible path taken by water not contaminated by high density FOGs (block arrows; labelled "a"); and b) a possible path taken by water contaminated by high density FOGs (broken arrows; labelled "b").

Before operation of the device, a source of water contaminated by FOGs is connected to the inlet (4) of the device and the water outlet (46) of the device is connected to a water collection or drainage system.

As shown by FIG. 8, the filtering portion (40) is downstream of the separating portion (14), wherein the direction of water flow is from the inlet (4) and towards the water outlet (46). This means that water contaminated by FOGs enters the device via the inlet (4), flows through the separating portion (14) first and then flows through the filtering portion (40).

In operation of the device shown by FIG. 8, water contaminated by FOGs ("FOG/water mixture") continuously flows through the inlet (4) and into the lower chamber (11a) of the separator inlet chamber (10). The FOG/water mixture is held in the lower chamber (11a) of the separator inlet chamber (10) for a sufficient amount of time to allow any low density FOGs contained within the FOG/water mixture to separate from the water and float upwards towards the surface of the water, where they are contained below the top plate (20) of the separating portion (14). An example of a low density FOG/water interface is indicated by feature (26) and is located just below the top plate (20). The low density FOG/water interface may occur at any location below the top plate (20) and depends on the concentration of low density FOGs in the FOG/water mixture and the speed with which the FOG/water mixture enters the separator inlet chamber (10).

For the separation of free FOG droplets having a droplet diameter of ≥150 µm, the separation time under gravity is approximately 30 seconds. Therefore, holding the FOG/water mixture in the separation chamber for 30 seconds is a sufficient amount of time to separate the low density FOGs from the waste water.

As the flow of the FOG/water mixture into the lower chamber (11a) of the separator inlet chamber (10) continues, the low density FOGs are moved upwards along the slope of the top plate (20) and towards the aperture in the highest point of the top plate (20), where they then enter into the riser tube (22). The low density FOGs are eventually emitted from the device via the horizontal outlet tube (24) of the low density FOG outlet (27). The low density FOGs can then be disposed of. Alternatively, the low density FOGs are stored in a storage container connected to the horizontal outlet tube (24) until they can be disposed of.

Meanwhile, as the flow of the FOG/water mixture into the lower chamber (11a) of the separator chamber (2) continues, water contaminated by the remaining FOGs flows through the slot (18) below the control plate (16). The water flowing through the slot (18) in the control plate (16) is not contaminated by many low density FOGs as a majority of the low density FOGs have been removed by the separating portion (14). However, the water may be contaminated by high density FOGs and FOG droplets having a small droplet diameter, such that the FOGs do not separate from the water under gravity.

The continuous flow of the FOG/water mixture through the separator chamber (2) causes the level of the FOG/water mixture to rise up between the control plate (16) and the weir plate (8), above and over the top of the weir plate (8) and into the separator outlet chamber (12). The level of FOG/water mixture in the separator outlet chamber (12) rises up the vertical wall (9) until the FOG/water mixture is able to flow out of the separator outlet chamber (12) and into the filter chamber (42) via the flow passage (6).

The filter (44) is positioned within the filter chamber (42) at a level below the level of the flow passage (6), meaning that the filter (44) is thus located in a bottom portion of the filter chamber (42). This means that, once in the filter chamber (42), the FOG/water mixture can take two possible routes through the filter chamber (42), as indicated by the block arrows (labelled as route "a") and the broken arrows (labelled as route "b") on FIG. 8.

Due to the position of the filter (44) relative to the flow passage (6), on continuous flow of the FOG/water mixture into the device, water not contaminated by FOGs, or water contaminated by a negligible concentration of FOGs, is able flow from the flow passage (6) into the filter chamber (42) and out of the water outlet (46), without flowing through the filter (44). This is the route shown by the block arrows on FIG. 8 (route "a").

At the same time, "sunken" high density FOGs and any water surrounding the high density FOGs will flow from the flow passage (6), sink downwards and then pass through the perforations of the filter holder (48) and come into contact with the filter (44) inside the filter holder (48). The water will then flow through the pores of the filter (44) and the filter (44) will remove the remaining FOGs from the water by adsorbing the FOGs onto the surfaces of the filter (44). After the removal of the FOGs, any clean water will flow from the filter (44), out of the filter holder (48) and out of the filter chamber (42) by the water outlet (46). This is the route shown by the broken arrows on FIG. 8 (route "b").

The filter (44) extends across the length (L2) of the filter chamber (42), but is not in contact with the vertical wall (9) or the second side (43b) of the tank (1). This provides space for the water to enter and exit the filter (44).

The positions of the inlet (4), the top of the weir plate (8), the horizontal outlet tube (24), the flow passage (6), the filter (44) and the water outlet (46) are all determined in accordance with the average specific gravities of the FOGs and water. The relative positions of these features mean that the FOG/water mixture remains in the separator inlet chamber (10), the separator outlet chamber (12) and the filter chamber (42) for sufficient amounts of time to allow the low density FOGs to rise on top of the water and the high density FOGs to sink below the water.

The flow rate with which the FOG/water mixture enters the separator inlet chamber (10) is also chosen with this in mind.

Thus, with a constant flow of FOG/water mixture through the device, there is a continuous discharge of separated low density FOGs from the low density FOG outlet (27) and "clean" water from the water outlet (46), and the filter (44) continuously removes the remaining FOGs from the FOG/water mixture.

If there is a surge in the supply of FOG/water mixture into the device, then the low density FOG/water interface (26) will rise and water may enter the riser tube (22). For this reason, the low density FOG outlet (27) includes the control valve (28).

Under normal conditions, the ball float (32) of the control valve (28) will sit on the mesh sheet (24) and low density FOGs will be permitted to flow into the riser tube (22).

However, in the event of a surge in the supply of FOG/water mixture, water will enter the housing (30) of the control valve (28), causing the ball float (32) to rise and seal against the sealing ring (36) to prevent flow into the riser tube (22) of the low density FOG outlet (27). Thus water is prevented from entering the horizontal outlet tube (24) and being discharged from low density FOG outlet (27).

It is envisaged that such a device will be used in a commercial or industrial kitchen or catering establishments or in a household kitchen. As such, the device contains connections suitable for connecting the device to a commercial, industrial or household kitchen waste water disposal unit. A simple plastic waste pipe having a diameter of 1-2.5 inches is sufficient.

Figure 9:
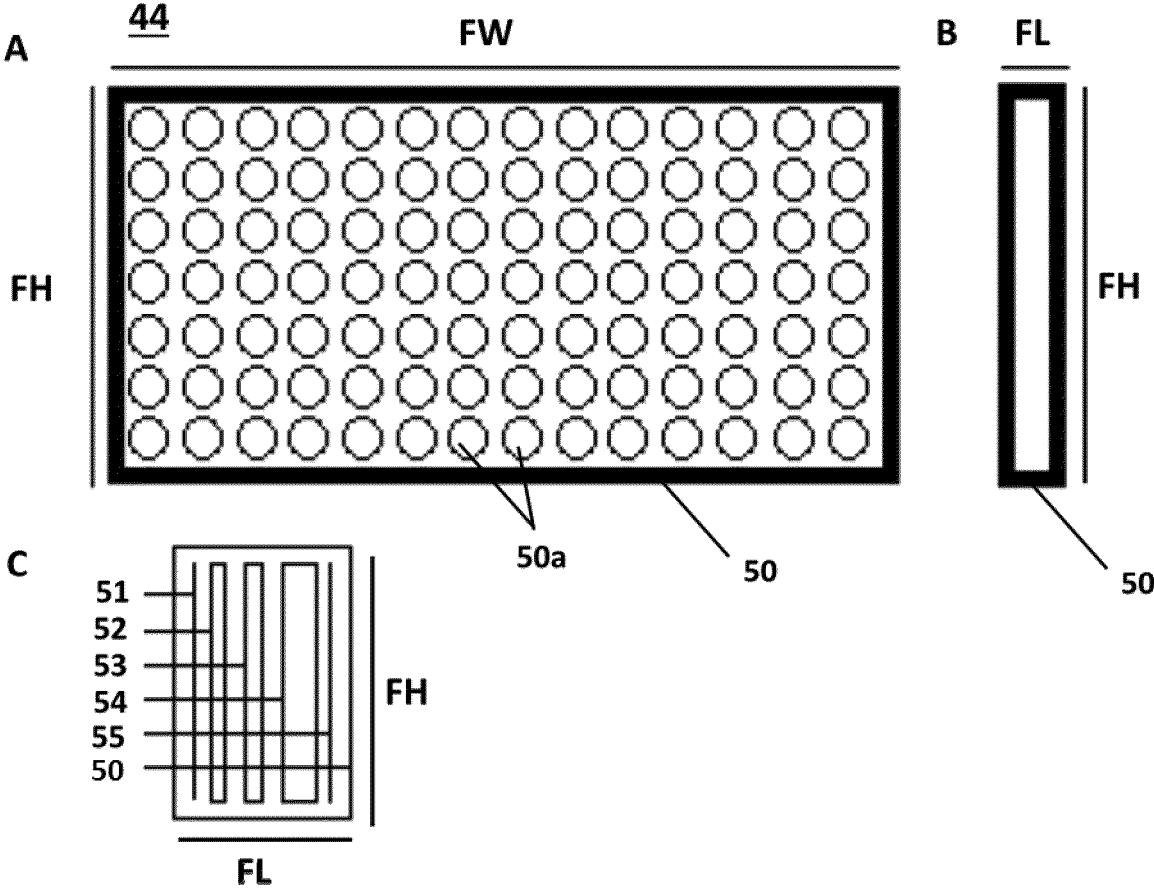
FIG. 9 shows a filter according to an embodiment of the present invention.

FIGS. 9A, B and C show a filter (44) according to an aspect of the present invention. FIG. 9A is a front view of the filter (44); FIG. 9B is a side view of the filter (44); and FIG. 9C is a cross-sectional side view of the filter (44) from the same direction as FIG. 9B.

The filter (44) is suitable for removing FOGs from contaminated water when used in a device (1) according to an aspect of the present invention as described above. The filter (44) may also be self-contained in a filter chamber (42) and configured to be attached to the back end of a separation device. The self-contained filter (44) may be retrospectively attached to the back end of a separation device.

As described above, the filter (44) is configured to be held in the filter chamber (42) by the filter holder (48).

The filter (44) comprises a casing (50) which surrounds the outside of the filter (44). The casing (50) has multiple pores (50a) through which, water in the filter chamber (42) enters and exits the filter (44). The casing (50) may have pores on every surface of the casing (50). Alternatively, the casing (50) may only have pores on its front and back surfaces, wherein the front surface of the casing (50) is the surface through which waste water passes through to enter the filter (44) and the back surface of the casing (50) is the surface through which clean water flows out of the filter (44).

The casing is made from stainless steel, so as to prevent rusting and to provide a layer of protection to the filter (44).

The casing (50) surrounds or encases several layers of material which make up the filter (44). The casing has a height (FH) of 190 mm in the height direction (H) of the tank (1) which corresponds to the height direction of the filter chamber (42). The casing (50) has a width (FW) of 350 mm in the width direction (W) of the tank (1) which corresponds to the height direction of the filter chamber (42). The casing has a length (FL) of 30 mm in the length direction (L2) of the filter chamber (42) which corresponds to the length (L) direction of the tank (1).

Depending upon the needs of the user, the exact filter dimensions will be determined on an ad hoc basis.

The filter (44) is made up of a number of rectangular filter layers, through which, contaminated water flows. Together the layers remove FOGs from the contaminated water such that "clean water" is emitted from the filter (44).

Each layer of the filter (44) has a surface area extending in the width (FW) and height (FH) direction of the casing (50).

In this example, the filter (44) comprises five rectangular perforated layers (51, 52, 53, 54 and 55) surrounded by cuboidal casing (50).

As discussed above, in operation, water flowing through the device flows in a direction from the inlet (4) and towards the water outlet (46) via the flow passage (6). The five layers (51-55) are arranged sequentially within the casing in the length (FL) direction of the casing (50) such that, water flowing though the device passes through the casing (50) surrounding the filter, and then through the layers of the filter sequentially, in the following order: the first layer (51), the second layer (52), the third layer (53), the fourth layer (53) and then the fifth layer (55). After passing through the fifth layer (55), the water then flows out of the casing (50).

In other words, water flowing from the separator chamber (2) enters the filter chamber (42) via the flow passage (6) and initially comes into contact with the casing (50) of the filter (44). After passing through the casing (50) of the filter (44), the water comes into contact with the first layer (51) of the filter (44). After passing through the first layer (51), the water then comes into contact with the second layer (52) of the filter (44). After passing through the second layer (52), the water then comes into contact with the third layer (53) of the filter (44). After passing through the third layer (53), the water then comes into contact with the fourth layer (54) of the filter (44). After passing through the fourth layer (54) of the filter (44), the water then comes into contact with the fifth layer (55) of the filter (44). As the waste water passes through each layer (51-55) of the filter (44), progressively smaller FOG molecules and other organic contaminants are removed from the water. Clean water then exits the filter (44) via the casing (50) and exits the filter chamber (42) via the water outlet (46).

The first layer (51) and the fifth layer (55) provide structural support to the second, third and fourth layers (52, 53, 54). The first layer (51) is perforated to allow contaminated water to flow into the second layer (52) and to remove any large contaminants from the water that will block the subsequent layers. The fifth layer (55) is perforated to allow contaminated water to flow out of the fourth layer (54).

The second layer (52), third layer (53) and fourth layer (54) each contain multiple pores. The second, third and fourth layer (52, 53, 54) of the filter is configured to remove FOGs and other contaminants from contaminated water. The fourth layer (54) has pores which have smaller pore diameters than the pores of the third layer (53). Similarly, the third layer (53) has pores which have smaller pore diameters than the pores of the second layer (52). Therefore, each layer (52, 53, 54) removes progressive smaller FOG molecules from the contaminated water as the contaminated water flows through the second layer (52), then through the third layer (53) and then through the fourth layer (54). After flowing through all five layers (51-55) of the filter (44), all of the FOG molecules are trapped by the filter layers and are hence removed from the contaminated water so that clean water is emitted from the outlet (46).

The first layer (51) is a perforated layer formed from multiple strands of pre-galvanised steel, each strand having a diameter of 1.3 mm. The strands are arranged to provide multiple pores within the first layer (51). Each pore has a width of 5 mm in the casing width direction (FW) and a height of 3.5 mm in the casing height direction (FH).

The pre-galvanised steel of the first layer (51) is preferably coated in a layer of DX53D+Z140 which provides corrosion protection. DX53D is a non-ageing steel. Z140 is a zinc-based coating, comprising >99% zinc. The Z140 coating is applied to the first layer (51) with a minimum concentration of 140 $g/m^2$ of zinc. The DX53D+Z140 coating has an average thickness in the length direction (FL) of 10 μm and may be applied to the pre-galvanised steel by a hot-dip galvanizing process.

The first layer has a total thickness in the length direction (FL) of 0.7 mm.

The first layer (51) provides structural support to the remaining filter layers (52-55).

The second layer (52) is adjacent to and in contact with the first layer (51). The second layer (52) is formed from non-woven thermally bonded polyester. The second layer is a layered structure formed from multiple layers of thermally bonded bi-component fibres. This second layer (52) is also called a synthetic media pad. The second layer (52) has a thickness in the length direction (FL) of 5 mm.

In use, waste water passes through the second layer (52) and a portion of the FOGs are removed from the contaminated water by the second layer (52). The second layer (52) is able to remove FOGs and organic contaminants having a diameter of greater than or equal to 1 μm and less than or equal to 50 μm. The particulate removal efficiency of the second layer is measured as a function of the particle size in the range of approximately 0.3 μm to 10 μm. The inventors have found that the second layer is able to remove up to 50%-75% of particles having a diameter of less than or equal to 10 μm.

The third layer (53) is adjacent to and in contact with the second layer (52). The third layer (53) is formed from a layer of polyester impregnated with carbon. The third layer (53) is formed from at least 100 g of polyester per square meter of surface area (53) of the third layer and at least 68 g of carbon per square meter of surface area of the third layer (53).

The third layer (53) has a thickness in the length direction (FL) of 6 mm.

In use, waste water passes through the pores of this third layer (53) and a portion of the FOGs are removed from the contaminated water by the third layer (53). This layer (53) is able to remove small FOGs molecules having a diameter of greater than or equal to 1 μm and less than or equal to 20 μm.

The fourth layer (54) is adjacent to and in contact with the third layer (53). The fourth layer (54) is formed from an activated carbon filter comprising granular activated carbon (GAC) bonded together and wrapped in polyester.

The GAC comprises multiple coal granules which have undergone an activation process to form numerous pores distributed randomly within the fourth layer (54). The coal granules have a range of diameters from 3.35 μm to 1.70 mm.

The GAC pieces are bonded together using adhesive. The entire bonded GAC structure is then surrounded by a protective layer of polyester.

The GAC comprises multiple pores, through which waste water passes. The pores of the GAC have a diameter of less than or equal to 100 μm, but greater than or equal to 2 μm. However, the pore diameter can be adjusted depending on the size of the FOG molecules that need to be removed from the contaminated water.

In use, waste water passes through the pores of the GAC in this fourth layer (54) and FOGs are absorbed onto the surfaces of the GAC. Therefore, this layer (54) removes a majority of the FOG molecules remaining in the water after passing through the previous layers (51, 52, 53). This layer (54) is able to remove extremely small FOG molecules having a droplet diameter of greater than 0 μm and less than or equal to 20 μm.

After passing through the fourth layer (54), the water comes into contact with the fifth layer (55) of the filter (44). The fifth layer (55) is made from the same material as and hence has very similar properties to the first layer (51) described above, and provides structural stability to the remaining layers (51, 52, 53, 54) of the filter (44). The fifth layer (55) is also coated in a protective DX53D+Z140 layer. Water which has passed through the remaining layers of the filter, then passes through the pores of the fifth layer (55) and exits the filter (44) via the pores (50a) of the casing (50).

Water emitted from the casing (50) of the filter (44) after passing through all five layers (51, 52, 53, 54, 55) of the filter (44) has a near zero or negligible concentration of FOGs and is hence classed as "clean water". This clean water is emitted from the casing (50) of the filter (44), passes through the filter holder (48) and exits the filter chamber (42) via the water outlet (46). Water released by the water outlet (46) is then clean enough to exit the premises by standard drainage systems.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include", and variations such as "comprises", "comprising", and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

<div align="center">REFERENCES</div>

A number of publications are cited above in order to more fully describe and disclose the invention and the state of the art to which the invention pertains. Full citations for these references are provided below. The entirety of each of these references is incorporated herein.

[1] American Petroleum Institute (1990), "Management of Water Discharges: Design and Operation of Oil-Water Separators", 421.

[2] Bande et al. (2008), "Oil field effluent water treatment for safe disposal by electro-flotation", Chemical Engineering Journal, pages 503-509, 137(3).

The invention claimed is:

1. A FOG (fats, oils and/or grease) filter for removing FOGs from waste water comprises:

a first perforated layer;

a second perforated layer adjacent to the first perforated layer, the second perforated layer comprising polyester;

a third perforated layer adjacent to the second perforated layer, the third perforated layer comprising polyester impregnated with carbon;

a fourth perforated layer adjacent to the third perforated layer, the fourth perforated layer comprising granular activated carbon bonded together using adhesive and surrounded by a protective layer of polyester;

a fifth perforated layer adjacent to the fourth perforated layer; and a perforated casing that surrounds and encases the first to fifth perorated layers, the perforated casing including a front surface and a back surface, each of which is provided with multiple pores, and sidewalls that extend between the front surface and the back surface of the casing;

wherein the second, third and fourth perforated layers are different to each other, the third perforated layer has pores having a smaller average pore diameter than the pores of the second perforated layer, and the fourth perforated layer has pores having a smaller average pore diameter than the pores of the third perforated layer;

wherein, in use, waste water flows through the front surface of the casing to enter the filter, through the first to fifth perforated layers, and through the back surface of the casing to exit the filter, and FOGs are removed from the waste water.

2. The filter according to claim 1, wherein the layers are ordered such that water flows through the first layer, the second layer, the third layer, the fourth layer and then the fifth layer, in this order.

3. The filter according to claim 1, wherein the granular activated carbon is formed from coal granules bonded together by adhesive.

4. The filter according to claim 1, wherein the granular activated carbon has pores with a diameter of less than or equal to 100 $\mu$m, but greater than or equal to 2 $\mu$m.

5. The filter according to claim 1, wherein the second layer is formed from a plurality of layers formed from non-woven thermally bonded polyester.

6. The filter according to claim 1, wherein the third layer is formed from at least 1-00 g of polyester per square meter of surface area of the third layer, and is impregnated with at least 68 g of carbon per square meter of surface area of the third layer.

7. The filter according to claim 1, wherein each of the first layer and the fifth layer are formed from multiple strands of pre-galvanised steel which are arranged to form multiple pores, wherein each strand has a diameter of 1.3 mm and each pore has a length of 5 mm and a height of 3.5 mm.

8. The filter according to claim 1, wherein each of the first layer and the fifth layer are coated in a layer of DX53D+Z140.

9. The filter according to claim 1, wherein:

the first layer has a total thickness of 0.7 mm;

the fifth layer has a total thickness of 0.7 mm;

the second layer has a total thickness of 5 mm, and/or the third layer has a total thickness of 6 mm.

10. A device for removing fats, oils and/or grease ("FOGs") from water, the device comprising:

an inlet for receiving water contaminated by FOGs into the device;

a separator for removing FOGs from water, wherein the separator removes the FOGs that separate from the water under gravity;

a FOG filter, wherein the FOG filter removes the FOGs remaining in the water after the water has passed through the separator;

a flow passage for fluidly connecting the separator to the filter; and a water outlet for emitting the water once FOGs have been removed;

wherein the FOG filter comprises:

a first perforated layer;

a second perforated layer adjacent to the first perforated layer, the second perforated layer comprising polyester;

a third perforated layer adjacent to the second perforated layer, the third perforated layer comprising polyester impregnated with carbon;

a fourth perforated layer adjacent to the third perforated layer, the fourth perforated layer comprising granular activated carbon bonded together and wrapped in polyester; and a fifth perforated layer adjacent to the fourth perforated layer;

wherein all of the layers are encased by a perforated casing, such that, in use, water flows through the casing and all of the layers of the filter and FOGs are removed from the water.

11. The device according to claim 10, wherein:

the filter is enclosed by a filter chamber having a first side wall and a second side wall opposite the first side wall;

the flow passage is in the first side wall of the filter chamber and is located above a top of the filter;

the water outlet is in the second side wall of the filter chamber and is located opposite a middle portion of the filter.

12. The device according to claim 11, wherein the first side wall and the second side wall of the filter chamber are opposite each other, and the filter is not in contact with the first side wall or the second side wall of the filter chamber.

13. The device according to claim 11, wherein the filter is in contact with a base of the filter chamber.

14. The device according to claim 11, wherein the filter chamber comprises a third side wall and a fourth side wall opposite the third side wall, wherein the third side wall and the fourth side wall are perpendicular to the first side wall and the second side wall, and the filter is in contact with the third side wall and the fourth side wall of the filter chamber.

15. The device according to claim 11, wherein the filter is held in the filter chamber by a perforate filter holder.

16. The device according to claim 10, wherein the separator comprises a separator chamber comprising:

an upright weir plate within the separator chamber and extending a width of the separator chamber from a base of the separator chamber to terminate at a level below a top of the separator chamber, wherein the upright weir plate divides the separator chamber into a separator inlet chamber and a separator outlet chamber;

an upright control plate located in the inlet chamber and extending the width of the separator chamber, a bottom of the upright control plate being located above the base of the separator chamber to define a slot between the control plate and the base of the separator chamber, the top of the upright control plate being at or above the level of the top of the upright weir plate; and a top plate capping the part of the inlet chamber to a side of the upright control plate remote from the upright weir plate, said top plate having an apex withing the separator inlet chamber positioned below the level of the top of the upright weir plate, the apex having an aperture for FOGs;

wherein the inlet of the device is positioned at a level below the top plate of the separator;

the flow passage is positioned at a level below the top of the weir plate; and a riser tube extends upwardly from the aperture in the top plate to a level above that of the top of the upright weir plate.

17. The device according to claim 16, wherein the riser tube comprises a one-way valve positioned in the riser tube and arranged to prevent flow of water through the riser tube.

18. The device according to claim 17, wherein the one-way valve is a ball valve incorporating a float which, with FOGs in the riser tube, keeps the riser tube open and, with water in the riser rube, closes the riser tube.

19. The device according to claim 16, wherein the top plate is integral with or secured to the control plate and is of a generally inverted V-shape in transverse section, with the apex of the transverse section extending upwardly and inwardly of the separator chamber from a region adjacent the inlet, to a region of integration of the top plate with the upright control plate.

20. A device for removing fats, oils and/or grease ("FOGs") from waste water, the device comprising:

an inlet for receiving water contaminated by FOGs into the device;

a separator for removing FOGs from water, wherein the separator removes the FOGs that separate from the water under gravity;

a filter chamber comprising a first side wall and a second side wall opposite the first side wall;

a flow passage for fluidly connecting the separator to the filter chamber, the flow passage being provided in the first side wall of the filter chamber;

a water outlet for emitting the cleaned water from the device, the water outlet being provided in the second side wall of the filter chamber; and a filter for removing FOGs from waste water located in the filter chamber:

wherein the flow passage is located above a top of the filter and the water outlet is located opposite a middle portion of the filter; and wherein the filter comprises:

a first perforated layer;

a second perforated layer adjacent to the first perforated layer, the second perforated layer comprising polyester;

a third perforated layer adjacent to the second perforated layer, the third perforated layer comprising polyester impregnated with carbon;

a fourth perforated layer adjacent to the third perforated layer, the fourth perforated layer comprising granular activated carbon bonded together and wrapped in polyester; and a fifth perforated layer adjacent to the fourth perforated layer;

wherein all of the layers are encased by a perforated casing, such that, in use, water flows through the casing and all of the layers of the filter and FOGs are removed from the water.

21. A method of using the device according to claim 16, wherein water contaminated by FOGs is received by the inlet at a flow rate of 1.5 litres per second.

22. A method of using the device according to claim 16, wherein the filter is replaced periodically.

23. A method of removing FOGs from water using the filter according to claim 1, wherein the FOGs are released from animal and/or vegetable products.

* * * * *